(12) United States Patent
Xia et al.

(10) Patent No.: US 10,809,481 B2
(45) Date of Patent: Oct. 20, 2020

(54) METHOD FOR CONTINUOUSLY PRODUCING OPTICAL FIBER CABLE AND SYSTEM THEREOF

(71) Applicants: FUTONG GROUP (JIASHAN) COMMUNICATION TECHNOLOGY CO., LTD., Jiaxing (CN); Futong Jiashan Optical Fiber and Cable Technology Co., Ltd., Jiaxing (CN)

(72) Inventors: Chengnan Xia, Jiaxing (CN); Minxi Jiang, Jiaxing (CN); Guanghui Li, Jiaxing (CN); Tiannuo Shi, Jiaxing (CN); Zhihao Qian, Jiaxing (CN)

(73) Assignees: FUTONG GROUP (JIASHAN) COMMUNICATION TECHNOLOGY CO., LTD., Jiaxing (CN); FUTONG JIASHAN OPTICAL FIBER AND CABLE TECHNOLOGY CO., LTD., Jiaxing (CN)

( * ) Notice: Subject to any disclaimer, the term of this patent is extended or adjusted under 35 U.S.C. 154(b) by 0 days.

(21) Appl. No.: 16/407,075

(22) Filed: May 8, 2019

(65) Prior Publication Data
US 2020/0116967 A1    Apr. 16, 2020

(30) Foreign Application Priority Data
Oct. 15, 2018    (CN) .......................... 2018 1 1197220

(51) Int. Cl.
G02B 6/44    (2006.01)
G02B 6/00    (2006.01)
B65H 75/18   (2006.01)

(52) U.S. Cl.
CPC ........... *G02B 6/4457* (2013.01); *B65H 75/18* (2013.01); *B65H 2701/32* (2013.01)

(58) Field of Classification Search
CPC ........... G02B 6/44; G02B 6/4457; G02B 6/00
(Continued)

(56) References Cited

U.S. PATENT DOCUMENTS 4,028,081 A * 6/1977 Marcatili .............. C03B 37/022
65/392
4,388,095 A * 6/1983 Schneider ......... C03B 37/01815
65/417
(Continued)

FOREIGN PATENT DOCUMENTS

CN    106927294 A    7/2017
CN    201035198 Y    3/2018

*Primary Examiner* — Kaveh C Kianni
(74) *Attorney, Agent, or Firm* — Bayramoglu Law Offices LLC

(57) ABSTRACT

A method for continuously producing an optical fiber cable includes: producing a cable core through cable core producing equipment; conveying the produced cable core to a first cable storing device; conveying the cable core from the first cable storing device to a sheath extrusion device, wherein an exterior of the cable core is covered with a sheath, and the optical fiber cable is obtained by processing; receiving the optical fiber cable from the sheath extrusion device by a cable rolling device, wherein the optical fiber cable is rolled at a tray, and a finished tray rolled with the optical fiber cable is obtained; checking whether the finished tray rolled with the optical fiber cable is qualified, and carrying an unqualified finished tray rolled with the optical fiber cable to a repairing area for repairing until qualified; and fixing sealing plates at a qualified finished tray through a sealing device.

15 Claims, 12 Drawing Sheets

(58) Field of Classification Search
USPC .................................................. 385/137
See application file for complete search history.

(56) References Cited

U.S. PATENT DOCUMENTS

| | | | | |
|---|---|---|---|---|
| 4,446,686 A * | 5/1984 | Panuska | ............... | G02B 6/4484 264/1.28 |
| 4,490,828 A * | 12/1984 | Fukuhara | ................ | F27D 11/02 219/553 |
| 4,530,750 A * | 7/1985 | Aisenberg | ............. | C03C 25/104 118/405 |
| 4,801,186 A * | 1/1989 | Wagatsuma | ............ | C03C 25/18 385/128 |
| 4,826,278 A * | 5/1989 | Gartside, III | .......... | G02B 6/449 385/105 |
| 4,832,442 A * | 5/1989 | Pappas | ................. | G02B 6/4422 174/40 R |
| 5,302,419 A * | 4/1994 | Muzzy | .................... | B29C 70/20 427/185 |
| 5,440,665 A * | 8/1995 | Ray | ........................ | B82Y 15/00 385/106 |
| 5,637,507 A * | 6/1997 | Wicks | ................... | C03C 14/002 436/166 |
| 5,649,043 A * | 7/1997 | Adams | ................. | G02B 6/4413 385/110 |
| 5,684,904 A * | 11/1997 | Bringuier | ............... | G02B 6/441 385/106 |
| 5,686,150 A * | 11/1997 | Matsumoto | ............ | B01J 37/344 427/212 |
| 5,740,941 A * | 4/1998 | Lemelson | ............... | C04B 41/85 220/62.15 |
| 5,751,880 A * | 5/1998 | Gaillard | ............... | G02B 6/4413 385/103 |
| 5,809,194 A * | 9/1998 | Lovie | ................... | G02B 6/4407 347/4 |
| 5,837,626 A * | 11/1998 | McCullough | ............. | D01F 8/08 442/353 |
| 5,996,216 A * | 12/1999 | Varga | ..................... | B65H 49/16 242/131 |
| 6,003,341 A * | 12/1999 | Bloom | .................. | G02B 6/2551 65/484 |
| 6,051,096 A * | 4/2000 | Nagle | .................... | C04B 35/573 156/311 |
| 6,054,177 A * | 4/2000 | Endoh | ..................... | B29B 15/12 156/166 |
| 6,178,278 B1 * | 1/2001 | Keller | .................. | G02B 6/4436 385/109 |
| 6,411,761 B1 * | 6/2002 | Yokokawa | ........... | G02B 6/4433 385/102 |
| 6,480,653 B1 * | 11/2002 | Hulin | ................... | G02B 6/4413 385/100 |
| 6,788,857 B2 * | 9/2004 | Pouilly | ................ | G02B 6/4413 385/104 |
| 8,625,944 B1 * | 1/2014 | Parris | ................... | G02B 6/4429 385/109 |
| 8,625,945 B1 * | 1/2014 | Parris | ................... | G02B 6/4429 385/109 |
| 9,791,653 B2 * | 10/2017 | Aznag | .................. | G02B 6/4444 |
| 10,191,237 B2 * | 1/2019 | McAlpine | ............ | G02B 6/4494 |
| 2002/0001443 A1 * | 1/2002 | Bringuier | ............... | G02B 6/441 385/113 |
| 2002/0141712 A1 * | 10/2002 | O'Connor | ............ | G02B 6/4435 385/107 |
| 2002/0197030 A1 * | 12/2002 | McAlpine | ............ | G02B 6/441 385/103 |
| 2003/0007774 A1 * | 1/2003 | Christopher | ............ | G02B 6/25 385/147 |
| 2005/0169588 A1 * | 8/2005 | Sutehall | ............... | G02B 6/4485 385/109 |
| 2012/0066987 A1 * | 3/2012 | Malofsky | ............ | B65H 57/26 52/173.1 |

* cited by examiner

METHOD FOR CONTINUOUSLY PRODUCING OPTICAL FIBER CABLE AND SYSTEM THEREOF

CROSS REFERENCE TO THE RELATED APPLICATIONS

This application is based upon and claims priority to Chinese Patent Application No. 201811197220.2, filed on Oct. 15, 2018, the entire contents of which are incorporated herein by reference.

TECHNICAL FIELD

This invention relates to a field of optical fiber cable production, and more particularly, to a method for continuously producing an optical fiber cable and a system thereof.

BACKGROUND

In the existing optical cable production, a cable producing process and a sheathing process are two separate processes. The cable producing process is to produce a cable core after a unitube or a filler is stranded and yarn binding is finished; and the sheathing process is to carry the cable core after temporary storage to a cable core placing frame for extrusion sheath production.

Production characteristics of the cable producing process is: in the production process, due to the raw material as a yarn or the material of the filler, the equipment is easy to be stopped midway, and manual intervention is required. Production characteristics of the sheathing process is: once the production begins, the equipment cannot be stopped within a standard length (2 KM/3 KM), otherwise the product will have a non-standard length.

In the existing process, the cable producing process and the sheathing process cannot be reliably combined for production. The cable core needs to be separately collected and stored in a warehouse. When the sheathing process is carried out, the cable core is taken out from the warehouse and placed in the cable core placing frame, which makes production efficiency of the optical fiber cable is not high.

In addition, in the sheathing process, after cable rolling reaches the standard length, it needs to reduce the speed thereby manually unloading a finished tray and loading an empty tray; and the finished tray after exiting from the equipment is manually packed after being checked to be qualified, sealing plates are fixed around the supporting disks of the tray, and packaging efficiency is relative low.

SUMMARY

Aiming at the above-mentioned problems and overcoming at least one deficiency, this invention provides a method for continuously producing an optical fiber cable and a system thereof.

A technical solution adopted by this invention is as follows.

A method for continuously producing an optical fiber cable includes the following steps:

(1) producing a cable core through cable core producing equipment;

(2) conveying the produced cable core to a first cable storing device for cable core storing in place;

(3) conveying the cable core from the first cable storing device to a sheath extrusion device, wherein an exterior of the cable core is covered with a sheath, and the optical fiber cable is obtained by processing;

(4) receiving the optical fiber cable from the sheath extrusion device by a cable rolling device, wherein the optical fiber cable is rolled at a tray, and a finished tray rolled with the optical fiber cable is obtained;

(5) checking whether the finished tray rolled with the optical fiber cable is qualified, and carrying an unqualified finished tray rolled with the optical fiber cable to a repairing area for repairing until qualified; and (6) fixing sealing plates at a qualified finished tray through a sealing device.

In this application, "conveying the cable core from the first cable storing device to the sheath extrusion device" is not limited to a situation in which the cable core directly enters the sheath extrusion device after exiting from the first cable storing device, and it can also be a situation in which the cable core enters the sheath extrusion device after entering a plurality of devices; similarly, "receiving the optical fiber cable from the sheath extrusion device by the cable rolling device" is not limited to a situation in which the optical fiber cable directly enters the cable rolling device after exiting from the sheath extrusion device, and it can also be a situation in which the optical fiber cable enters the cable rolling device after entering a plurality of devices.

In the method for continuously producing the optical fiber cable of this application, in Step (5), an appearance of the finished tray rolled with the optical fiber cable can be checked for whether it is qualified through video checking equipment or a manual checking way By disposing the first cable storing device, the cable core can be stored through the method for continuously producing the optical fiber cable of this application, such that a worker has time to deal with problems occurred in a cable core producing process. Therefore the cable core producing process and a sheathing process can be combined for production, and conveying of a cable core semi-finished product can be avoided, thereby greatly improving production efficiency.

This application further provides a system of continuously producing the optical fiber cable used to achieve the above-mentioned method for continuously producing the optical fiber cable, and the system of continuously producing the optical fiber cable includes:

cable core producing equipment, used to produce a cable core;

a first cable storing device, used to receive and store the cable core from the cable core producing equipment;

a sheath extrusion device, used to receive the cable core from the first cable storing device and cover a sheath at an exterior of the cable core, wherein an optical fiber cable is obtained by processing;

a cable rolling device, used to receive the optical fiber cable from the sheath extrusion device and roll the optical fiber cable at a tray, wherein a finished tray rolled with the optical fiber cable is obtained; and a sealing device, used to fix sealing plates at the finished tray rolled with the optical fiber cable.

in one embodiment of this invention, the first cable storing device is an active type cable storing device, and the first cable storing device includes:

supporting frames, wherein a first guide rail is installed at each of the supporting frames;

a cable storing fixed wheel, rotatably installed at the supporting frames;

a first moving block, movably disposed at the first guide rails, wherein the first moving block is capable of reciprocating along the first guide rails;

a cable storing moving wheel, rotatably installed at the first moving block;

a tension frame, fixed relative to the supporting frames, wherein a second guide rail is installed at the tension frame;

a tension fixed wheel, rotatably installed at the tension frame;

a second moving block, movably disposed at the second guide rail, wherein the second moving block is capable of reciprocating along the second guide rail;

a tension moving wheel, rotatably installed at the second moving block;

an elastic mechanism, used to make the tension moving wheel have a tendency to move away from the tension fixed wheel;

a displacement sensor, installed at the tension frame and configured to detect position information of the tension fixed wheel; and a moving wheel driving mechanism, configured to drive the first moving block to move on the first guide rails according to a signal of the displacement sensor.

"The cable storing fixed wheel rotatably installed at the supporting frames" described in this application not only includes a situation in which the cable storing fixed wheel is directly rotatably installed at the supporting frames, but also includes a situation in which the cable storing fixed wheel is rotatably installed at a certain component, and this component and the supporting frames are fixed to each other, that is, the corresponding component is regarded as one part of the supporting frames.

"The tension frame fixed relative to the supporting frames" described in this application not only includes a situation in which the tension frame is fixed at the supporting frames or other structures, but also includes a situation in which the tension frame is integrated with the supporting frames as a whole.

In practical use, the displacement sensor can be a linear displacement sensor.

In practical use, the elastic mechanism can be a compression spring or an extension spring, and the elastic mechanism can also be two magnetic blocks. When the elastic mechanism includes two magnetic blocks, one magnetic block is fixed relative to the tension frame, the other magnetic block is fixed with the second moving block, and there is an interactive magnetic force between the two magnetic blocks.

The moving wheel driving mechanism can be a power driving motor, a wheel is installed at the first moving block, the wheel cooperates with the first guide rails, and the power driving motor drives the wheel to rotate. In practical use, each of the first guide rails can also be a rack structure. At this time, gears cooperating with the racks can be disposed at the first moving block, and the moving wheel driving motor drives the gears to rotate.

The working principle of the first cable storing device: during working, the cable core is first wound at the tension moving wheel and the tension fixed wheel, then the cable core is wound at the cable storing fixed wheel and the cable storing moving wheel, and finally the cable core is outward conveyed. When the cable core is stored, a linear velocity at which the cable core enters the first cable storing device is greater than a linear velocity at which the cable core exits from the first cable storing device. At this time, under the action of the elastic mechanism, the tension moving wheel moves away from the tension fixed wheel. The displacement sensor detects a position deviation of the tension fixed wheel, the moving wheel driving mechanism drives the first moving block to move away from the cable storing fixed wheel according to the signal of the displacement sensor, and a cable storing length increases. When the cable core is pulled back, the linear velocity at which the cable core enters the first cable storing device is smaller than the linear velocity at which the cable core exits from the first cable storing device. At this time, the tension moving wheel overcomes the force of the elastic mechanism and moves close to the tension fixed wheel. The displacement sensor detects the position deviation of the tension fixed wheel, the moving wheel driving mechanism drives the first moving block to move close to the cable storing fixed wheel according to the signal of the displacement sensor, and the cable storing length decreases.

The cable storing device in the prior art has the following disadvantages. 1) When the cable core storing length is relative great, the distance between the fixed wheel and the moving wheel becomes greater, and the friction generated by the weight of a chain or the weight of a steel wire will increase traction of the cable core, and the requirement of minimum tension of the cable core cannot be guaranteed in the cable core storing process. 2) When the cable core storing length is relative great, the number of the guide wheels for cable core storing will increase, and the weight of the cable storing moving wheel itself will increase, which leads to a significant increase in the traction of the cable core and cannot meet the tension requirement of about 40-160 N required in the cable core storing process for the cable core. For the above-mentioned reasons, the existing passive cable storing device generally has a cable core storing length of about 200 in, and less than 3 min is left for manual processing according to a production speed of 80 m/min. It is impossible to leave sufficient time for the worker to deal with abnormal conditions, and it cannot ensure that the cable core length is the required standard length after the abnormal conditions.

For the first cable storing device of this application, the moving wheel driving mechanism is used to drive the cable storing moving wheel to move, and a moving distance is adjusted by positions of the tension wheels at the front. By adopting this structure, additional tension generated by multiple guide wheels when the cable core with a great length is stored is avoided, and small tension can control the cable core with the great length, which meets the requirements of the optical fiber cable production. Therefore, in the first cable storing device of this application, the number of guide wheels of the cable storing moving wheel and the number of guide wheels of the cable storing fixed wheel can be increased as well as the length of the first guide rails, and the cable core storing length can reach 2-3 km.

In the method for continuously producing the optical fiber cable of this application, by disposing the first cable storing device, the cable core producing process and the sheathing process can be combined for production, and conveying of the cable core semi-finished product can be avoided, thereby greatly improving the production efficiency.

In one embodiment of this invention, the first cable storing device further includes a guide pulley installed at the tension frame. The cable core is wound at the tension fixed wheel and the tension moving wheel after passing through the guide pulley.

By disposing the guide pulley, the cable core is easy to be guided thereby being better wound at the tension fixed wheel and the tension moving wheel.

in one embodiment of this invention, the cable core producing equipment includes a strength member cable releasing device, a unitube cable releasing device, a filler cable releasing device, a yarn stranding device, and a yarn binding device;

a metal band welding device is disposed between the first cable storing device and the sheath extrusion device, and the metal band welding device is used to receive the cable core from the first cable storing device and to weld a metal band around the cable core; and a second cable storing device is disposed between the sheath extrusion device and the cable rolling device, the second cable storing device is used to receive and store the optical fiber cable from the sheath extrusion device and to convey the optical fiber cable to the cable rolling device.

In practical use, in order to achieve the continuous yarn binding requirement for the cable core, a high-speed yarn binding machine with a yarn rebinding function disclosed in a patent with a publication No. of CN201035198Y is adopted for the yarn binding device.

The same structure as the active type cable storing device or a passive type cable storing device can be adopted for the second cable storing device, that is, the device in the prior art can be adopted. For example, in practical use, a buffer device used in the optical fiber cable production disclosed in a patent with a publication No. of CN1069272941A can be adopted.

In optical fiber cable industry, it is necessary to neatly roll the optical fiber cable at a cable rolling tray layer by layer. This process is called cable winding in the industry. Before the cable winding, an inner end with a length of 1-10 m at the beginning of the optical fiber cable should be threaded through one side of the tray and be fixed. It is called pre-reservation at the inner end in the industry, and the pre-reservation at the inner end is an essential part for a cable winding process in the optical fiber cable industry. The tray at which the optical fiber cable is rolled includes a stuff canister and two supporting disks coaxially connected at two ends of the stuff canister. The middle of each of the supporting disks has a positioning hole, and one of the supporting disks further has a cable threading hole outside the stuff canister used for the cable to be threaded through during pre-reservation at inner end operation. The prior art discloses a variety of devices capable of automatically roll the cable, but these devices do not involve a structure for the pre-reservation at the inner end, that is, it still requires manual operation throughout the whole process for the pre-reservation at the inner end, and labor intensity of the worker is high.

Aiming at the above-mentioned problems, the cable rolling device is improved in this application. In one embodiment of this invention, the cable rolling device includes:

a gantry, wherein the gantry has a first rail;

two stuff receiving arms, slidably disposed at the first rail, wherein the two stuff receiving arms are a first stuff receiving arm and a second stuff receiving arm, respectively, and two chunk heads are rotatably installed at opposite sides of the two stuff receiving arms, respectively;

a cable rolling motor, installed at one of the stuff receiving arms and configured to drive the chunk head on the stuff receiving arm at which the cable rolling motor is located to rotate;

an optical fiber cable pre-reserving mechanism, installed at the first stuff receiving arm and configured to receive the optical fiber cable threaded through a cable threading hole of a tray and allow the optical fiber cable to be pulled out from the cable threading hole for pre-reservation a set length; and an optical fiber cable fixing mechanism, installed at the first stuff receiving arm and configured to fix the optical fiber cable at one of the supporting disks of the tray after the optical fiber cable is pre-reserved.

The optical fiber cable pre-reserving mechanism includes:

a toothed disk, rotatably installed at the first stuff receiving arm and coaxial with the chunk head on the first stuff receiving arm, wherein a unidirectional transmission structure is disposed between the toothed disk and the chuck head on the first stuff receiving arm, the toothed disk rotates relative to the chuck head when the toothed disk rotates in a first direction, the chuck head is capable of being driven to rotate synchronously when the toothed disk rotates in a second direction, and the first direction is opposite to the second direction;

a first motor, movably installed at the first stuff receiving arm, wherein a first gear is installed at an output shaft of the first motor;

a first cylinder, installed at the first stuff receiving arm and configured to control movement of the first motor, such that the first gear of the first motor engages with the toothed disk or the first gear is separated from the toothed disk; and a cable fastening assembly, installed at the toothed disk and configured to fasten the optical fiber cable from the cable threading hole of the tray.

The stuff receiving arms can move along the first rail such that the positioning holes of the tray are fastened tightly or the tray is released through the chunk heads. The working principle of the cable rolling device is as follows. The end of the optical fiber cable is threaded through the cable threading hole by a manual way or other mechanical equipment, enters the optical fiber cable pre-reserving mechanism and is fastened tightly by the cable fastening assembly. Then the first motor works, the toothed disk is driven to rotate in the first direction through the engagement between the first gear and the toothed disk. Because of the action of the unidirectional transmission structure, the chuck head on the first stuff receiving arm does not rotate synchronously, and the optical fiber cable will move relative to the tray and further be pulled out from the cable threading hole of the tray under the action of the cable fastening assembly, that is, cable pre-reservation operation can be automatically carried out. After the pre-reservation is finished, the optical fiber cable fixing mechanism works and fixes the optical fiber cable at one of the supporting disks of the tray. Then a piston rod of the first cylinder extends and drives the first motor to move, such that the first gear is separated from the toothed disk. At this time, the cable rolling device works and drives the chunk head to rotate in the second direction. Because of the action of the unidirectional transmission structure, the chuck head and the toothed disk rotate synchronously, that is, optical fiber cable rolling operation can be carried out at this time.

In practical use, the first direction is clockwise, and the second direction is counterclockwise; or the first direction is counterclockwise, and the second direction is clockwise In the cable rolling device of this application, for the optical fiber cable threaded through the cable threading hole, the pre-reservation at the inner end operation can be automatically achieved. Compared with the existing manual operation, the production efficiency can be effectively improved.

In one embodiment of this invention, a plurality of positioning guide rods are disposed around the toothed disk, a positioning block is installed at each of the positioning guide rods, and each of the positioning blocks has the same distance from an axis of the toothed disk. A distance between a position where the cable fastening assembly fastens the optical fiber cable and the axis of the toothed disk is greater than or equal to a distance between each of the positioning blocks and the axis of the toothed disk, and the positioning blocks are used to support the optical fiber cable thereby facilitating winding of pre-reserved optical fiber cable. The positioning guide rods and the positioning blocks are disposed such that the optical fiber cable can be wound at the outside of the positioning blocks when the optical fiber cable is pulled out, which can effectively improve the quality of the pre-reservation at the inner end operation.

In practical use, the position of each of the position blocks at the corresponding positioning guide rods can be adjusted, thereby adapting to trays with different sizes. For example, each of the positioning blocks is sleeved at the corresponding positioning guide rod and be fixed by a fastener.

In one embodiment of this invention, the cable fastening assembly includes a cable fastening cylinder fixed at the toothed disk, the cable fastening cylinder is fixedly provided with a cable fastening base block, and a piston rod of the cable fastening cylinder is fixedly provided with a cable fastening block. Space between the cable fastening base block and the cable fastening block is used for the optical fiber cable to be threaded through, and the cable fastening block and the cable fastening cylinder are close to each other to fasten the optical fiber cable through work of the cable fastening cylinder.

In order to facilitate reliable work of the cable fastening cylinder. In practical use, a detecting sensor can be installed at the cable fastening assembly for sensing whether the optical fiber cable is threaded through the space between the cable fastening base block and the cable fastening block. When the optical fiber cable is detected to be threaded through the space between the cable fastening base block and the cable fastening block, the cable fastening cylinder works to fasten the optical fiber cable tightly.

In one embodiment of this invention, the optical fiber cable fixing mechanism includes:

a nailing cylinder, installed at the first stuff receiving arm; and a first nailing gun, fixed at a piston rod of the nailing cylinder and used to fix the optical fiber cable at one of the supporting disks of the tray after the pre-reservation of the optical fiber cable is finished.

When the pre-reservation at the inner end of the end of the optical fiber cable is finished through the optical fiber cable pre-reserving mechanism, a U-shaped nail is ejected through the first nailing gun to fix the inner end of the optical fiber cable at one of the supporting disks of the tray.

In one embodiment of this invention, the first stuff receiving arm has a runner, and the nailing cylinder is slidably disposed at the runner. The optical fiber cable fixing mechanism includes a driving structure configured to drive the nailing cylinder to move along the runner or includes a fixing structure configured to fix the nailing cylinder at the runner.

The disposing of the runner can change the position of the nailing cylinder thereby adapting to trays with different sizes, in practical use, the driving structure can be a cylinder or a lead screw pair, and the fixing structure can be a fastener.

one embodiment of this invention, the gantry has a first rack, a second gear and a second motor driving the second gear to rotate are installed at each of the two stuff receiving arms, and the second gears engage with the first rack. The corresponding stuff receiving arm is driven to move on the first rail when the second motor rotates.

In one embodiment of this invention, the cable rolling motor is installed at the first stuff receiving arm; and the unidirectional transmission structure includes:

a ratchet, coaxially fixed at the chunk head on the first stuff receiving arm;

a pawl, rotatably installed at the toothed disk; and an elastic member, used to allow the pawl to have a tendency to rotate toward the ratchet.

In order to make the tray be driven to rotate by the chunk head on the first stuff receiving arm more reliably, preferably, the chunk head on the first stuff receiving arm has a limiting post, and one of the supporting disks of the tray has a limiting hole matching with the limiting post.

In one embodiment of this invention, the cable rolling device further includes two tray conveying rails arranged side by side, a tray conveying seat able to be lifted is movably installed at each of the two tray conveying rails, and the tray conveying seats are used to support trays.

Two tray conveying rails arranged side by side are disposed to cooperate with two stuff receiving arms moving on the first rail, such that the stuff receiving arms can work above any of the tray conveying rails, and the two tray conveying seats can cooperate with each other. One tray conveying seat can convey a finished tray with the rolled optical fiber cable, and the other tray conveying seat can convey an empty tray. This structure can achieve continuous production, which greatly improves the production efficiency.

In one embodiment of this invention, the cable rolling device further includes a cable threading mechanism, and the cable threading mechanism includes:

a first machine frame, disposed at one side of the gantry, wherein the first machine frame has a second rail disposed vertically or obliquely;

a first lift seat, movably disposed at the second rail;

a first driving mechanism, configured to drive the first lift seat to move on the second rail;

a rotating seat, rotatably installed at the first lift seat;

a first cable guiding wheel group, installed at the rotating seat and used for the optical fiber cable to pass through;

a third motor, configured to drive the first cable guiding wheel group to work and to drive the optical fiber cable located in the first cable guiding wheel group to move;

a retractable tube, installed at the rotating seat, wherein an end of the retractable tube has a second cable guiding wheel group, and the second cable guiding wheel group is configured to receive the optical fiber cable from the first cable guiding wheel group;

a retractable cylinder, configured to drive the retractable tube to extend or retract, such that the second cable guiding wheel group is close to or away from the tray; and a second cylinder, wherein a cylinder body of the second cylinder is rotatably installed at the first lift seat, a piston rod of the second cylinder is rotatably connected with the rotating seat, and the second cylinder is configured to drive the rotating seat to rotate.

The first driving mechanism may adopt any of the existing driving mechanisms, such as a rack and pinion combination, a transmission belt structure, a lead screw pair structure and so on, and the first driving mechanism can precisely control the position at which the first lift seat is located on the second rail through a servo motor.

Both the first cable guiding wheel group and the second cable guiding wheel group include guide wheels arranged up and down, and the optical fiber cable passes between the guide wheels. The working principle of the cable threading mechanism is as follows. The first driving mechanism can control the lifting of the first lift seat, such that the optical fiber cable on the retractable tube and the cable threading hole of the tray are substantially in the same plane. The second cylinder works, and the piston rod of the second cylinder extends to drive the rotating seat to rotate by a set angle. At this time, the optical fiber cable on the retractable tube is exactly aligned with the cable threading hole of the tray, then the retractable cylinder works to drive the second cable guiding wheel group to be close to the tray. The first cable guiding wheel group and the second cable guiding wheel group work, such that the optical fiber cable can be reliably threaded through the cable threading hole of the tray.

In practical use, preferably, when the piston rod of the second cylinder retracts, a central line of the retractable tube is perpendicular to the axis of the chunk head. A cable threading function can be automatically realized and trays with different sizes can be adapted through the cable threading mechanism in this application.

In practical use, in order to facilitate rolling the optical fiber cable at the tray, the rotating seat includes a lower seat and an upper seat. The upper seat can reciprocate relative to the lower seat, which can be realized by a rail and a driving member. At this time, the lower seat is rotatably installed at the first lift seat, the piston rod of the second cylinder is rotatably connected with the lower seat, and the first cable guiding wheel group, the third motor, the retractable tube, and the retractable cylinder are all installed at the upper seat. This structure enables the upper seat to reciprocate when the optical fiber cable is rolled, thereby preventing the optical fiber cable from swinging left and right and reliably carrying out the rolling operation.

one embodiment of this invention, the cable threading mechanism further includes a cable cutting assembly, and the cable cutting assembly includes:

a cable cutting rod, installed at the first machine frame, wherein the cable cutting rod has a fixed blade;

a cutting blade, slidably installed at the cable cutting rod, wherein there is space between the cutting blade and the fixed blade for the optical fiber cable to pass through; and a cutting cylinder, installed at the cable cutting rod and configured to drive the cutting blade to move toward the fixed blade thereby cutting the optical fiber cable between the cutting blade and the fixed blade.

After rolling the optical fiber cable at the tray is finished, by controlling the first lift seat to move, the optical fiber cable is located between the cutting blade and the fixed blade. Then the cutting cylinder drives the cutting blade to move toward the fixed blade and cuts the optical fiber cable between the cutting blade and the fixed blade, and automatic cutting operation is achieved.

In one embodiment of this invention, the sealing device includes:

a second machine frame;

a conveyor belt, installed at the second machine frame and used for conveying the sealing plate, wherein one end of the conveyor belt is a conveying out end;

a first stopping needle, movably disposed at a front end of the conveying out end and used for cooperating with the first piece of the sealing plate from the conveying out end thereby preventing the sealing plate from moving outside;

a first lift mechanism, installed at the second machine frame and configured to drive the first stopping needle to move up and down, wherein the first stopping needle no longer blocks the sealing plate when the first lift mechanism drives the first stopping needle to move upward;

two third cylinders, disposed at two sides of the conveying out end of the conveyor belt, wherein the two third cylinders cooperate with each other and are configured to tighten the first piece of the sealing plate from the conveying out end;

two fourth cylinders, installed at two sides of the conveyor belt, respectively, wherein the fourth cylinders correspond to and cooperate with the third cylinders one by one, a piston rod of each of the fourth cylinders is fixed with the corresponding third cylinder, and the two fourth cylinders cooperate with each other and are configured to drive the two third cylinders and the sealing plate tightened by the third cylinders to move away from the conveyor belt;

second nailing guns, used to make the sealing plate conveyed from the fourth cylinders fixed at the supporting disks of the finished tray rolled with the optical fiber cable; and third lift mechanisms, installed at the second machine frame and configured to drive the second nailing guns to move up and down.

"The front end of the conveying out end" refers to one end along a conveying direction of the conveyor belt. The first piece of the sealing plate described in this application refers to the foremost sealing plate not conveyed by the fourth cylinders, that is, the original second piece of the sealing plate becomes the first piece of the sealing plate when the sealing plate is conveyed by the fourth cylinders for one time.

In practical operation, the position of the finished tray rolled with the optical fiber cable is adjusted first such that an upper edge of each of the supporting disks of the finished tray rolled with the optical fiber cable is tangent to a lower edge of the first piece of the sealing plate. The working principle of the sealing device is as follows. The conveyor belt works and drives a plurality of sealing plates to move toward the conveying out end. When the first piece of the sealing plate contacts with and is limited by the first stopping needle, the conveyor belt stops working. The first lift mechanism works and drives the first stopping needle to move upward, and the first stopping needle no longer blocks the first piece of the sealing plate. At this time, two third cylinders work to tighten the first piece of the sealing plate, and then the piston rod of each of the fourth cylinders extends thereby driving the two third cylinders and the sealing plate tightened by the two third cylinders to move away from the conveyor belt. Put the sealing plate into an upper part of the two supporting disks, then the third lift mechanisms work and drive the second nailing guns to move downward. The second nailing guns work and fix the sealing plate conveyed by the fourth cylinders at the supporting disks of the finished tray rolled with the optical fiber cable. After one piece of the sealing plate is fixed, each of the components is reset. After the finished tray rolled with the optical fiber cable is rotated by a set angle, repeat the above-mentioned action until the last piece of the sealing plate is fixed at the supporting disks of the finished tray rolled with the optical fiber cable. As the diameter of the tray body increases after adding the sealing plates, when the last piece of the sealing plate is transported, it is necessary to move the whole tray down a distance of the sealing plate and then carry out the operation. Finally the whole sealing work is finished.

The sealing plate is tightened by two third cylinders in this application, which has high reliability, long service life, and low maintenance cost compared with a way of using a foam sucker. After the third cylinders tighten the sealing plate, the sealing plate can be directly conveyed to the corresponding position of the finished tray rolled with the optical fiber cable by the fourth cylinders. The stroke of this structure is short, the whole action is simple, and the efficiency is higher.

In order to increase the work efficiency, preferably, there are two second nailing guns located above corresponding supporting disks, respectively.

In one embodiment of this invention, the sealing device further includes a controller controlling operation of the first lift mechanism, the third lift mechanisms, the third cylinders, the fourth cylinders, the conveyor belt, and the second nailing guns, and first photoelectric sensors disposed above two sides of the conveying out end of the conveyor belt. The first photoelectric sensors are electrically connected with the controller and are configured to detect whether the first piece of the sealing plate from the conveying out end is in place.

The two first photoelectric sensors can detect whether two sides of the first piece of the first sealing plate are in place, and a signal is sent to the controller after both the two sides are in place. The controller controls the conveyor belt to stop rotating and then controls the first lift mechanism, the third cylinders, the fourth cylinders, the third lift mechanisms, and the second nailing guns to work.

In one embodiment of this invention, the front end of the conveying out end of the conveyor belt has a storing plate, there is a gap between the first stopping needle and the storing plate, and the first photoelectric sensors are configured to emit infrared rays to the gap thereby detecting whether corresponding sides of the sealing plate are in place.

When the sealing plate is in place, the first piece of the sealing plate will cover the gap. At this time, if both the left first photoelectric sensor and the right first photoelectric sensor have a sense, it indicates that the sealing plate is already in place, and the controller can control the conveyor belt to stop rotating according to the signal of the first photoelectric sensors.

Each of the first photoelectric sensors is a diffuse reflection sensor, other sensors capable of detecting the sealing plate can be adopted in practical use.

In one embodiment of this invention, the sealing device further includes:

a second stopping needle, movably disposed at a front end of the first stopping needle and used to cooperate with the sealing plate conveyed by the fourth cylinders thereby limiting a position of the sealing plate; and a second lift mechanism, configured to drive the second stopping needle to move up and down, wherein the second stopping needle no longer blocks the sealing plate conveyed by the fourth cylinders when the second lift mechanism drives the second stopping needle to move upward.

"The front end of the first stopping needle" refers to one end along the conveying direction of the conveyor belt. In practical operation, preferably, the second stopping needle is located directly above an uppermost edge of the supporting disks. The working principle of the second stopping needle is as follows. The second lift mechanism makes the second stopping needle be in a low position, at this time the sealing plate conveyed by the fourth cylinders cooperates with the second stopping needle, and the second stopping needle can limit the position of the sealing plate. After work of the second nailing guns is finished, and the second lift mechanism drives the second stopping needle to move upward, the finished tray rolled with the optical fiber cable is controlled to rotate by a set angle. By disposing the second lift mechanism and the second stopping needle, the sealing plate will be stopped by the second stopping needle before being fixed at the supporting disks by the second nailing guns, such that a gap between each two adjacent sealing plates fixed at the supporting disks is a certain value, which has high precision. In practical use, if no gap is required between each two adjacent sealing plates, it is only necessary to control the third lifting mechanisms, such that the second stopping needle is kept in a relative high position.

In one embodiment of this invention, each of two sides of the conveyor belt has a limiting side plate; and the first lift mechanism, the second lift mechanism, and the third lift mechanism are all cylinders.

The limiting side plates can limit a left position and a right position of the sealing plate, and the first lift mechanism, the second lift mechanism, and the third lift mechanism are all cylinders. This structure is simple.

In one embodiment of this invention, the second machine frame includes two upright posts, and each of the upright posts has a vertical guide rail. The sealing device further includes two seat tightening assemblies and two lift assemblies. The seat tightening assemblies are movably disposed at the corresponding vertical guide rails and are used to tighten and drive the finished tray rolled with the optical fiber cable to rotate. The lift assemblies are used to chive the corresponding seat tightening assemblies to move up and down along the vertical guide rails. Each of the seat tightening assemblies includes:

a second lift seat, slidably disposed at the corresponding vertical guide rail, wherein the second lift seat has a horizontal guide rail;

a horizontal moving seat, slidably disposed at the horizontal guide rail;

a tightening disk, rotatably installed at the horizontal moving seat, wherein the tightening disk is used to cooperate with a side wall of one of the supporting disks of the finished tray rolled with the optical fiber cable;

a first servo motor, configured to drive the tightening disk to rotate; and a fifth cylinder, installed at the second lift seat and configured to drive the horizontal moving seat to reciprocate along the horizontal guide rail; and two seat tightening assemblies cooperate with each other and are used to tightening two supporting disks of the finished tray rolled with the optical fiber cable, respectively.

When the seat tightening assemblies work, the fifth cylinders work and push the horizontal moving seats to move toward the finished tray rolled with the optical fiber cable, such that the two tightening disks tighten two supporting disks of the finished tray rolled with the optical fiber cable, respectively. At this time, the lift assemblies drive the finished tray rolled with the optical fiber cable to move up and down, and the finished tray rolled with the optical fiber cable can be driven by the first servo motors to rotate precisely.

In one embodiment of this invention, each of the lift assemblies is a lead screw pair, and each of the lift assemblies includes:

a lead screw, rotatably installed at the upright post, wherein the second lift seat has a nut cooperating with the lead screw through a thread; and a second servo motor, configured to drive the lead screw to rotate thereby driving the seat tightening assembly to move up and down.

In one embodiment of this invention, each of the tightening disks includes:

a disk body;

a positioning protrusion, fixed at a middle section of the disk body and used to cooperate with one of the positioning holes of the finished tray rolled with the optical fiber cable for positioning; and a plurality of auxiliary rods, fixed at the disk body and uniformly arranged around an axis of the disk body, wherein an end of each of the auxiliary rods has an elastic sucker.

Reliable positioning can be achieved through the positioning protrusions, and the seat tightening assemblies tighten the finished tray rolled with the optical fiber cable tightly by pressure. Then the finished tray rolled with the optical fiber cable is driven to rotate by friction, and there is no need to dispose a shift fork hole. The auxiliary rods and elastic suckers are disposed thereby ensuring that the finished tray rolled with the optical fiber cable is reliably driven to rotate.

In practical use, each of the elastic suckers is connected with a pipe, which sucks air and removes the air to achieve sucking and releasing the tray. In practical use, preferably, an end face of each of the disk bodies cooperating with one of the supporting disks has an uneven structure, and the uneven structure can increase the friction.

In one embodiment of this invention, the sealing device further includes a controller and a plurality of second photoelectric sensors disposed at the upright posts spaced apart from each other up and down. The second photoelectric sensors and the second servo motors are electrically connected with the controller, and each of the second photoelectric sensors is configured to detect a height range of the supporting disks of the finished tray rolled with the optical fiber cable.

As different optical fiber cables have different diameters and lengths, the sizes of used trays are also different. Take the optical fiber cable as an example. The supporting disks at both sides of a common wooden tray have diameters of 800 mm, 900 mm, and 1000 mm and so on. In this application, by disposing a plurality of second photoelectric sensors spaced apart from each other up and down, a plurality of second photoelectric sensors can be triggered when the finished tray rolled with the optical fiber cable is just transported to the second photoelectric sensors. As different finished trays rolled with the optical fiber cable have different sizes, the numbers of triggered second photoelectric sensors are also different. Therefore, the size of the finished tray rolled with the optical fiber cable can be determined according the number of the triggered second photoelectric sensors, such that a rising distance and so on of the seat tightening assemblies can be determined. This application is more applicable.

In practical use, each of the second photoelectric sensors may be a diffuse reflection sensor or may also be an active infrared intrusion sensor and so on.

In one embodiment of this invention, the sealing device further includes:
tray transporting rails, disposed below the conveyor belt; and
a transporting seat, movably disposed on the tray transporting rails and used to support the finished tray rolled with the optical fiber cable.

Beneficial effects of this invention are as follows. By disposing the first cable storing device, through the method for continuously producing the optical fiber cable of this application, the cable core producing process and the sheathing process can be combined for production, and conveying of the cable core semi-finished product can be avoided, thereby greatly improving the production efficiency.

FIGURE REFERENCE NUMERALS

Figure 1:
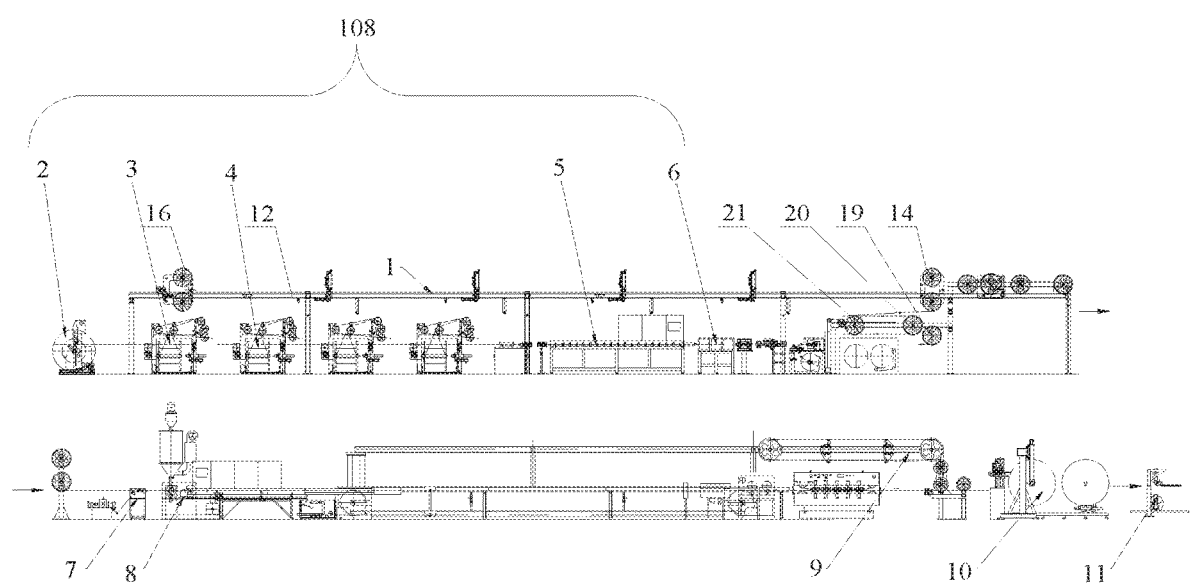
FIG. 1 is a schematic diagram of a system of continuously producing an optical fiber cable.

1 first cable storing device; 2 strength member cable releasing device; 3 filler cable releasing device; 4 unitube cable releasing device; 5 yarn stranding device; 6 yarn binding device; 7 metal band welding device; 8 sheath extrusion device; 9 second cable storing device; 10 cable rolling device; 11 sealing device; 12 supporting frame; 13 first guide rail; 14 cable storing fixed wheel; 15 first moving block; 16 cable storing moving wheel; 17 moving wheel driving mechanism; 18 tension frame; 19 guide pulley; 20 tension fixed wheel; 21 tension moving wheel; 22 second guide rail; 23 second moving block; 24 cable core; 25 tray; 26 stuff canister; 27 supporting disk; 28 positioning hole; 29 cable threading hole; 30 limiting hole; 31 gantry; 32 first rail; 33 first stuff receiving arm; 34 second stuff receiving arm; 35 chunk head; 36 cable rolling motor; 37 optical fiber cable pre-reserving mechanism; 38 optical fiber cable fixing mechanism; 39 toothed disk; 40 unidirectional transmission structure; 41 first motor; 42 first gear; 43 first cylinder; 44 cable fastening assembly; 45 positioning guide rod; 46 positioning block; 47 cable fastening cylinder; 48 cable fastening base block; 49 cable fastening block; 50 nailing cylinder; 51 first nailing gun; 52 first rack; 53 second motor; 54 ratchet; 55 pawl; 56 limiting post; 57 tray conveying rail; 58 tray conveying seat; 59 cable threading mechanism; 60 first machine frame; 61 second rail; 62 first lift seat; 63 rotating seat; 64 first cable guiding wheel group; 65 third motor; 66 retractable tube; 67 second cable guiding wheel group; 68 retractable cylinder; 69 second cylinder; 70 cable cutting assembly; 71 cable cutting rod; 72 fixed blade; 73 cutting blade; 74 cutting cylinder; 75 optical fiber cable; 76 second machine frame; 77 conveyor belt; 78 sealing plate; 79 third cylinder; 80 fourth cylinder; 81 conveying out end; 82 first stopping needle; 83 first lift mechanism; 84 second stopping needle; 85 second lift mechanism; 86 storing plate; 87 first photoelectric sensor; 88 second nailing gun; 89 third lift mechanism; 90 limiting side plate; 91 upright post; 92 second photoelectric sensor; 93 tray transporting rail; 94 transporting seat; 95 vertical guide rail; 96 second lift seat; 97 horizontal guide rail; 98 horizontal moving seat; 99 tightening disk; 100 first servo motor; 101 fifth cylinder; 102 disk body; 103 positioning protrusion; 104 auxiliary rod; 105 elastic sucker; 106 second servo motor; 107 lead screw;

108 cable core producing equipment; 109 displacement sensor; 110 elastic mechanism; 111 piston rod of the cable fastening cylinder; 112 piston rod of the nailing cylinder; 113 piston rod of the second cylinder; 114 piston rod of the fourth cylinder; 115 elastic member; 116 second gear; 117 first driving mechanism; and 118 controller

DETAILED DESCRIPTION OF THE EMBODIMENTS

This invention will be described in detail below with reference to the accompanying drawings.

A method for continuously producing an optical fiber cable includes the following steps:

(1) a cable core is produced by cable core producing equipment;

(2) the produced cable core is conveyed to a first cable storing device for cable core storing in place;

(3) the cable core from the first cable storing device is conveyed to a sheath extrusion device, an exterior of the cable core is covered with a sheath, and the optical fiber cable is obtained by processing;

(4) the optical fiber cable from the sheath extrusion device is received by a cable rolling device, the optical fiber cable is rolled at a tray, and a finished tray rolled with the optical fiber cable is obtained;

(5) the finished tray rolled with the optical fiber cable is checked for whether it is qualified, and an unqualified finished tray rolled with the optical fiber cable is carried to a repairing area for repairing until qualified; and an appearance of the finished tray rolled with the optical fiber cable can be checked for whether it is qualified through video checking equipment or a manual checking way in practical use; and (6) sealing plates are fixed at a qualified finished tray through a sealing device.

By disposing the first cable storing device, the cable core can be stored through the method for continuously producing the optical fiber cable of this application, such that a worker has time to deal with problems occurred in a cable core producing process. Therefore, the cable core producing process and a sheathing process can be combined for production, and conveying of a cable core semi-finished product can be avoided, thereby greatly improving production efficiency.

Figure 2:
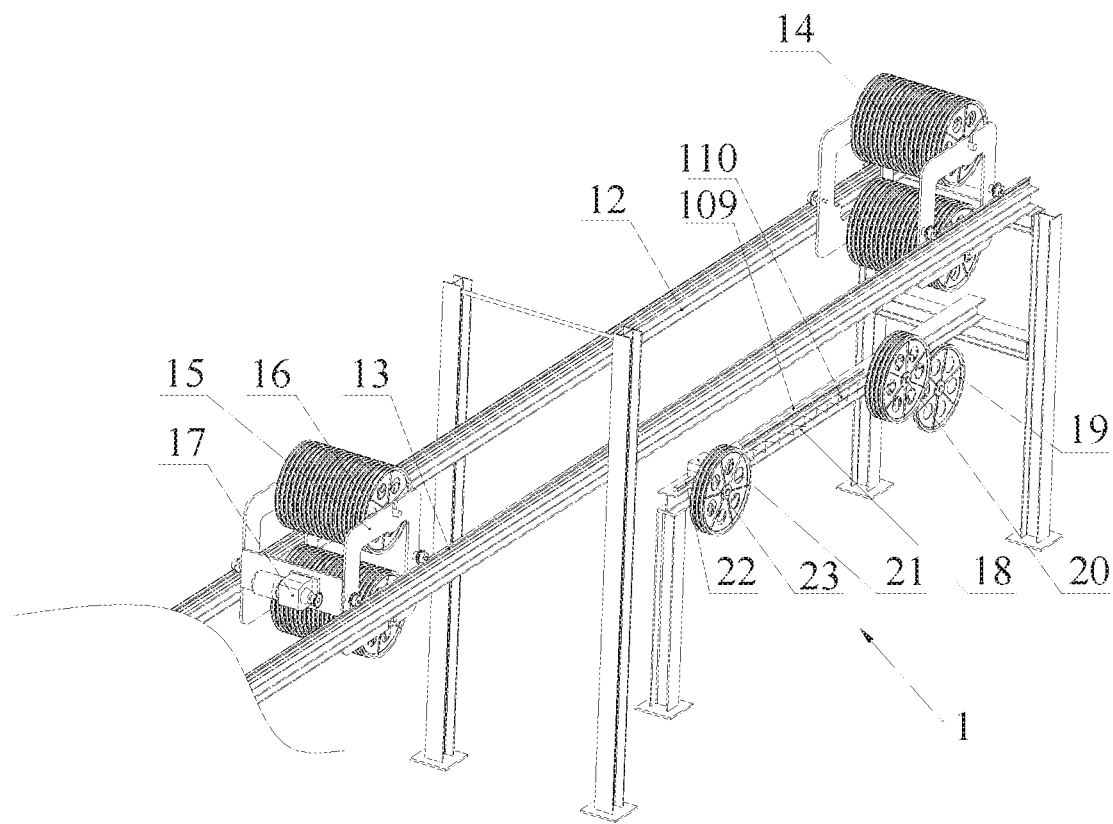
FIG. 2 is a structural schematic diagram of a first cable storing device.
Figure 3:
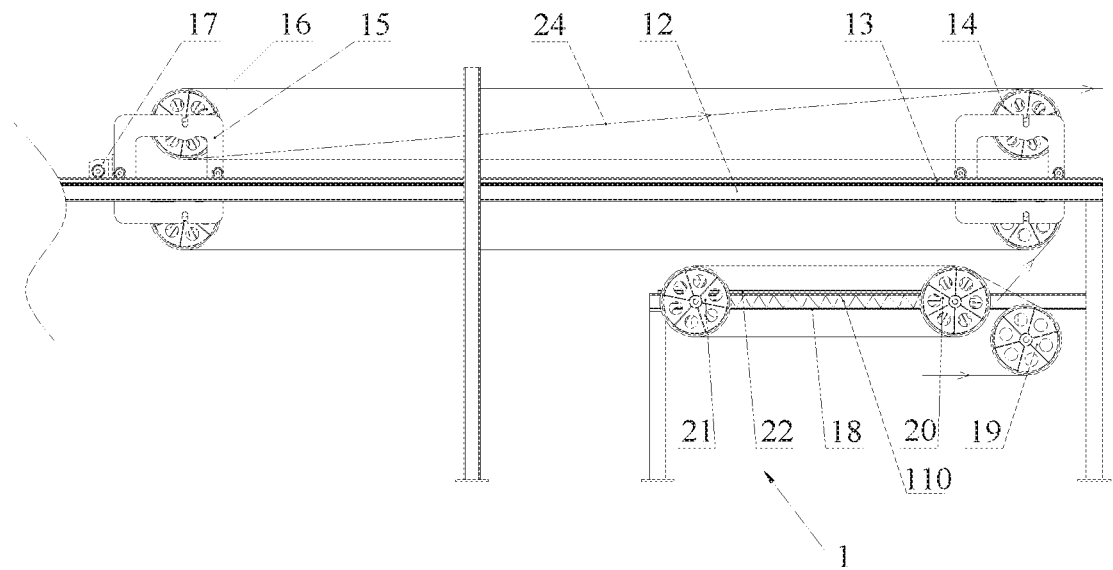
FIG. 3 is a side view of the first cable storing device.

As shown in FIG. 1, FIG. 2, and FIG. 3, this embodiment further provides a system of continuously producing the optical fiber cable used to achieve the above-mentioned method for continuously producing the optical fiber cable, and the system of continuously producing the optical fiber cable includes:

cable core producing equipment 108, used to produce a cable core 24;

a first cable storing device 1, used to receive and store the cable core from the cable core producing equipment 108;

a sheath extrusion device 8, used to receive the cable core from the first cable storing device 1 and cover a sheath at an exterior of the cable core, wherein an optical fiber cable is obtained by processing;

a cable rolling device 10, used to receive the optical fiber cable from the sheath extrusion device 8 and roll the optical fiber cable at a tray, wherein a finished tray rolled with the optical fiber cable is obtained: and a sealing device 11, used to fix sealing plates at the finished tray rolled with the optical fiber cable.

As shown in FIG. 2 and FIG. 3, in this embodiment, the first cable storing device 1 is an active type cable storing device, and the first cable storing device 1 includes:

supporting frames 12, wherein a first guide rail 13 is installed at each of the supporting frames 12;

a cable storing fixed wheel 14, rotatably installed at the supporting frames 12;

a first moving block 15, movably disposed at the first guide rails 13, wherein the first moving block 15 can reciprocate along the first guide rails 13;

a cable storing moving wheel 16, rotatably installed at the first moving block 15;

a tension frame 18, fixed relative to the supporting frames 12, wherein a second guide rail 2 is installed at the tension frame 18;

a tension fixed wheel 20, rotatably installed at the tension frame 18;

a second moving block 23, movably disposed at the second guide rail 22, wherein the second moving block 23 can reciprocate along the second guide rail 22;

a tension moving wheel 21, rotatably installed at the second moving block 23;

an elastic mechanism 110, used to make the tension moving wheel 21 have a tendency to move away from the tension fixed wheel 20;

a displacement sensor 109, installed at the tension frame 18 and configured to detect position information of the tension fixed wheel 20; and a moving wheel driving mechanism 17, configured to drive the first moving block 15 to move on the first guide rails 13 according to a signal of the displacement sensor 109.

The finished tray rolled with the optical fiber cable in this embodiment includes the tray and the optical fiber cable wound at the tray. In this application, "conveying the cable core from the first cable storing device to the sheath extrusion device" is not limited to a situation in which the cable core directly enters the sheath extrusion device 8 after exiting from the first cable storing device 1, and it can also be a situation in which the cable core enters the sheath extrusion device 8 after entering a plurality of devices; similarly, "receiving the optical fiber cable from the sheath extrusion device by the cable rolling device" is not limited to a situation in which the optical fiber cable directly enters the cable rolling device 10 after exiting from the sheath extrusion device 8, and it can also be a situation in which the optical fiber cable enters the cable rolling device 10 after entering a plurality of devices.

"The cable storing fixed wheel 14 rotatably installed at the supporting frames 12" described in this application not only includes a situation in which the cable storing fixed wheel 14 is directly rotatably installed at the supporting frames 12, but also includes a situation in which the cable storing fixed wheel 14 is rotatably installed at a certain component, and this component and the supporting frames 12 are fixed to each other, that is, the corresponding component is regarded as one part of the supporting frames 12.

"The tension frame fixed relative to the supporting frames 12" described in this application not only includes a situation in which the tension frame 18 is fixed at the supporting frames 12 or other structures, but also includes a situation in which the tension frame 18 is integrated with the supporting frames 12 as a whole.

In practical use, the displacement sensor 109 can be a linear displacement sensor.

In practical use, the elastic mechanism 110 can be a compression spring or an extension spring, and the elastic mechanism can also be two magnetic blocks; when the elastic mechanism is the compression spring, one end of the compression spring is located between the tension fixed wheel 20 and the tension moving wheel 21, and the other end of the compression spring cooperates with the second moving block 23; when the elastic mechanism is the extension spring, one end of the extension spring is located at one side of the tension moving wheel 21 away from the tension fixed wheel 20, and the other end of the extension spring cooperates with the second moving block 23; and when the elastic mechanism includes two magnetic blocks, one magnetic block is fixed relative to the tension frame 18, the other magnetic block is fixed with the second moving block 23, and there is an interactive magnetic force between the two magnetic blocks.

The moving wheel driving mechanism 17 can be a power driving motor, a wheel is installed at the first moving block 15, the wheel cooperates with the first guide rails 13, and the power driving motor drives the wheel to rotate. In practical use, each of the first guide rails 13 can also be a rack structure. At this time, gears cooperating with the racks can be disposed at the first moving block 15, and the moving wheel driving motor drives the gears to rotate.

The working principle of the first cable storing device 1: during working, the cable core 24 is first wound at the tension moving wheel 21 and the tension fixed wheel 20, then the cable core 24 is wound at the cable storing fixed wheel 14 and the cable storing moving wheel 16, and finally the cable core 24 is outward conveyed. When the cable core is stored, a linear velocity at which the cable core enters the first cable storing device 1 is greater than a linear velocity at which the cable core exits from the first cable storing device 1. At this time, under the action of the elastic mechanism 110, the tension moving wheel 21 moves away from the tension fixed wheel 20. The displacement sensor 109 detects a position deviation of the tension fixed wheel 20, the moving wheel driving mechanism 17 drives the first moving block 15 to move away from the cable storing fixed wheel 14 according to the signal of the displacement sensor 109, and a cable core storing length increases. When the cable core is pulled back, the linear velocity at which the cable core enters the first cable storing device 1 is smaller than the linear velocity at which the cable core exits from the first cable storing device 1. At this time, the tension moving wheel 21 overcomes the force of the elastic mechanism 110 and moves close to the tension fixed wheel 20. The displacement sensor 109 detects the position deviation of the tension fixed wheel 20, the moving wheel driving mechanism 17 drives the first moving block 15 to move close to the cable storing fixed wheel 14 according to the signal of the displacement sensor 109, and the cable storing length decreases.

For the first cable storing device 1 of this application, the moving wheel driving mechanism 17 is used to drive the cable storing moving wheel 16 to move, and a moving distance is adjusted by positions of the tension wheels at the front. By adopting this structure, additional tension generated by multiple guide wheels when the cable core with a great length is stored is avoided, and small tension can control the cable core with the great length, which meets the requirements of the optical fiber cable production. Therefore, in the first cable storing device 1 of this application, the number of guide wheels of the cable storing moving wheel 16 and the number of guide wheels of the cable storing fixed wheel 14 can be increased as well as the length of the first guide rails 13, and the cable core storing length can reach 2-3 km.

By disposing the first cable storing device, the cable core can be stored through the method for continuously producing the optical fiber cable of this application, such that the worker has time to deal with problems occurred in the cable core producing process. Therefore, the cable core producing process and the sheathing process can be combined for production, and conveying of the cable core semi-finished product can be avoided, thereby greatly improving the production efficiency.

As shown in FIG. 1, FIG. 2, and FIG. 3, in this embodiment, the first cable storing device 1 further includes a guide pulley 19 installed at the tension frame 18. The cable core is wound at the tension fixed wheel 20 and the tension moving wheel 21 after passing through the guide pulley 19. By disposing the guide pulley 19, the cable core is easy to be guided thereby being better wound at the tension fixed wheel 20 and the tension moving wheel 21.

In other embodiments, the first cable storing device can also be the structure of an existing cable storing device.

As shown in FIG. 1, in this embodiment, the cable core producing equipment 108 includes a strength member cable releasing device 2, a unitube cable releasing device 4, a filler cable releasing device 3, a yarn stranding device 5, and a yarn binding device 6;

a metal band welding device 7 is disposed between the first cable storing device 1 and the sheath extrusion device 8, and the metal band welding device 7 is used to receive the cable core from the first cable storing device 1 and to weld a metal band around the cable core; and a second cable storing device 9 is disposed between the sheath extrusion device 8 and the cable rolling device 10, the second cable storing device 9 is used to receive and store the optical fiber cable from the sheath extrusion device 8 and to convey the optical fiber cable to the cable rolling device 10.

In practical use, in order to achieve the continuous yarn binding requirement for the cable core, a high-speed yarn binding machine with a yarn rebinding function disclosed in a patent with a publication No, of CN201035198Y is adopted for the yarn binding device 6.

The same structure as the active type cable storing device or a passive type cable storing device can be adopted for the second cable storing device 9, that is, the device in the prior art can be adopted. For example, in practical use, a buffer device used in the optical fiber cable production disclosed in a patent with a publication No. of CN106927294A can be adopted.

Figure 4:
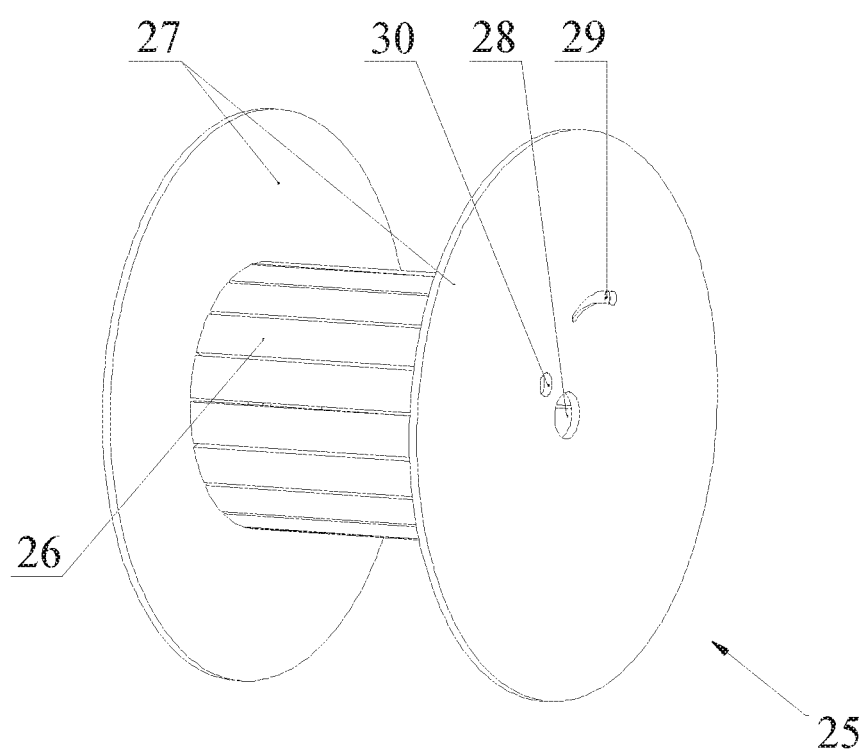
FIG. 4 is a schematic diagram of a tray.

In optical fiber cable industry, it is necessary to neatly roll the optical fiber cable at a cable rolling tray layer by layer. This process is called cable winding in the industry. Before the cable winding, an inner end with a length of 1-10 m at the beginning of the optical fiber cable should be threaded through one side of the tray and be fixed. It is called pre-reservation at the inner end in the industry, and the pre-reservation at the inner end is an essential part for a cable winding process in the optical fiber cable industry. As shown in FIG. 4, the tray 25 at which the optical fiber cable 75 is rolled includes a stuff canister 26 and two supporting disks 27 coaxially connected at two ends of the stuff canister 26. The middle of each of the supporting disks 27 has a positioning hole 28, and one of the supporting disks 27 further has a cable threading hole 29 outside the stuff canister 26 used for the cable to be threaded through during pre-reservation at inner end operation. The prior art discloses a variety of devices capable of automatically roll the cable, but these devices do not involve a structure for the pre-reservation at the inner end, that is, it still requires manual operation throughout the whole process for the pre-reservation at the inner end, and labor intensity of the worker is high.

Figure 5:
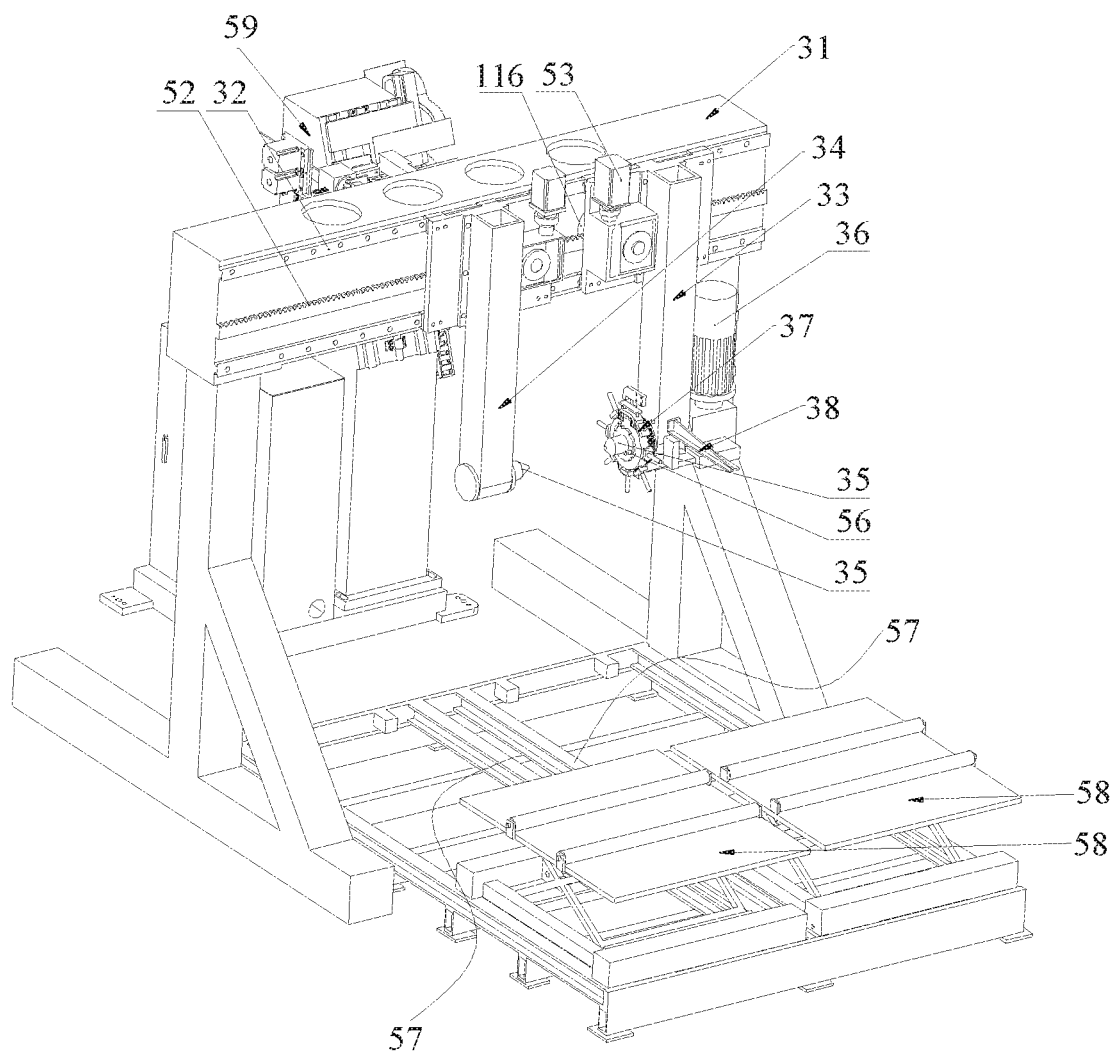
FIG. 5 is a structural schematic diagram of a cable rolling device.
Figure 6:
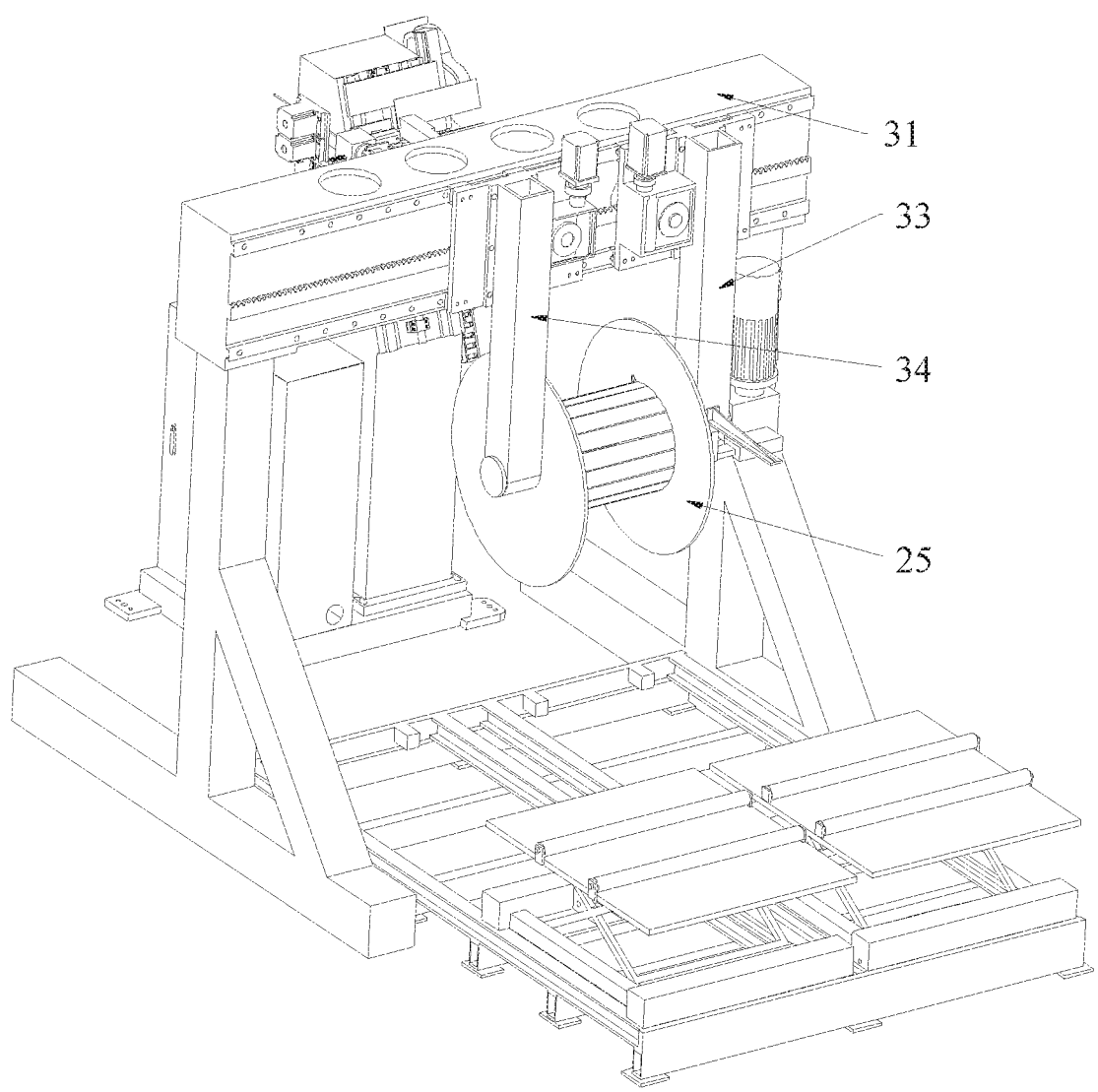
FIG. 6 is a schematic diagram of FIG. 5 after the tray is installed.
Figure 7:
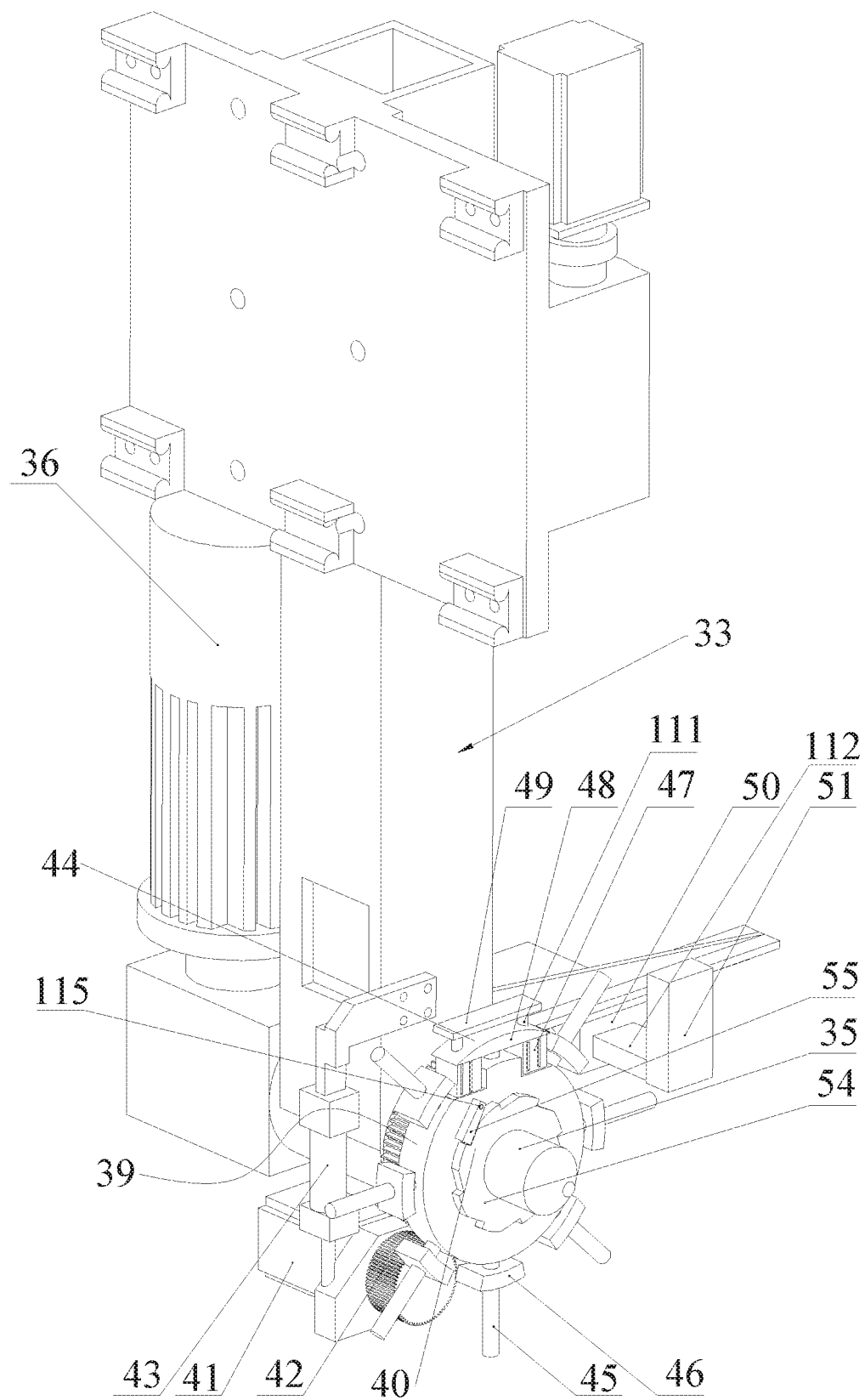
FIG. 7 is a schematic diagram of a first stuff receiving arm.

To solve the above-mentioned problems, the cable rolling device 10 is improved in this application. As shown in FIG. 5, FIG. 6, and FIG. 7, in this embodiment, the cable rolling device 10 includes:

a gantry 31, wherein the gantry 31 has a first rail 32;

two stuff receiving arms, slidably disposed at the first rail 32, wherein the two stuff receiving arms are a first stuff receiving arm 33 and a second stuff receiving arm 34, respectively, and two chunk heads 35 are rotatably installed at opposite sides of the two stuff receiving arms, respectively;

a cable rolling motor 36, installed at one of the stuff receiving arms and configured to drive the chunk head 35 on the stuff receiving arm at which the cable rolling motor is located to rotate;

an optical fiber cable pre-reserving mechanism 37, installed at the first stuff receiving arm 33 and configured to receive the optical fiber cable 75 threaded through a cable threading hole 29 of a tray and allow the optical fiber cable 75 to be pulled out from the cable threading hole 29 for pre-reservation a set length; and an optical fiber cable fixing mechanism 38, installed at the first stuff receiving arm 33 and configured to fix the optical fiber cable 75 at one of the supporting disks 27 of the tray after the optical fiber cable is pre-reserved.

The optical fiber cable pre-reserving mechanism 37 includes:

a toothed disk 39, rotatably installed at the first stuff receiving arm 33 and coaxial with the chunk head 35 on the first stuff receiving arm 33, wherein a unidirectional transmission structure 40 is disposed between the toothed disk 39 and the chunk head 35 on the first stuff receiving arm 33, the toothed disk 39 rotates relative to the chuck head 35 when the toothed disk 39 rotates in a first direction (clockwise), the chuck head 35 can be driven to rotate synchronously when the toothed disk 39 rotates in a second direction (counterclockwise), and the first direction is opposite to the second direction;

a first motor 41, movably installed at the first stuff receiving arm 33, wherein a first gear 42 is installed at an output shaft of the first motor 41;

a first cylinder 43, installed at the first stuff receiving arm 33 and configured to control movement of the first motor 41, such that the first gear 42 of the first motor 41 engages with the toothed disk 39 or the first gear 42 is separated from the toothed disk 39; and a cable fastening assembly 44, installed at the toothed disk 39 and configured to fasten the optical fiber cable 75 from the cable threading hole 29 of the tray.

The stuff receiving arms can move along the first rail 32 such that the positioning holes 28 of the tray 35 are fastened tightly or the tray is released through the chunk heads 35. The working principle of the cable rolling device 10 is as follows. The end of the optical fiber cable 75 is threaded through the cable threading hole 29 by a manual way or other mechanical equipment, enters the optical fiber cable pre-reserving mechanism 37 and is fastened tightly by the cable fastening assembly 44. Then the first motor 41 works, the toothed disk 39 is driven to rotate in the first direction through the engagement between the first gear 42 and the toothed disk 39. Because of the action of the unidirectional transmission structure 40, the chuck head 35 on the first stuff receiving arm 33 does not rotate synchronously, and the optical fiber cable will move relative to the tray and further be pulled out from the cable threading hole 29 of the tray under the action of the cable fastening assembly 44, that is, cable pre-reservation operation can be automatically carried out. After the pre-reservation is finished, the optical fiber cable fixing mechanism 38 works and fixes the optical fiber cable at one of the supporting disks 27 of the tray. Then a piston rod of the first cylinder 43 extends and drives the first motor 41 to move, such that the first gear 42 is separated from the toothed disk 39. At this time, the cable rolling motor 36 works and drives the chunk head 35 to rotate in the second direction. Because of the action of the unidirectional transmission structure 40, the chuck head 35 and the toothed disk 39 rotate synchronously, that is, optical fiber cable rolling operation can be carried out at this time.

In this embodiment, "the chuck head can be driven to rotate synchronously when the toothed disk rotates in the second direction (counterclockwise)" also refers that the toothed disk is driven to rotate synchronously when the chuck head rotates in the second direction.

In the cable rolling device 10 of this application, for the optical fiber cable threaded through the cable threading hole 29, the pre-reservation at the inner end operation can be automatically achieved. Compared with the existing manual operation, the production efficiency can be effectively improved.

As shown in FIG. 7, in this embodiment, a plurality positioning guide rods 45 are disposed around the toothed disk 39, a positioning block 46 is installed at each of the positioning guide rods 45, and each of the positioning blocks 46 has the same distance from an axis of the toothed disk 39. A distance between a position where the cable fastening assembly 44 fastens the optical fiber cable and the axis of the toothed disk 39 is greater than or equal to a distance between each of the positioning blocks 46 and the axis of the toothed disk 39, and the positioning blocks 46 are used to support the optical fiber cable thereby facilitating winding of pre-reserved optical fiber cable. The positioning guide rods 45 and the positioning blocks 46 are disposed such that the optical fiber cable can be wound at the outside of the positioning blocks 46 when the optical fiber cable is pulled out, which can effectively improve the quality of the pre-reservation at the inner end operation.

In practical use, the position of each of the position blocks 46 at the corresponding positioning guide rods 45 can be adjusted, thereby adapting to trays with different sizes. For example, each of the positioning blocks 46 is sleeved at the corresponding positioning guide rod 45 and be fixed by a fastener.

As shown in FIG. 7, in this embodiment, the cable fastening assembly 44 includes a cable fastening cylinder 47 fixed at the toothed disk 39, the cable fastening cylinder 47 is fixedly provided with a cable fastening base block 48, and a piston rod 111 of the cable fastening cylinder 47 is fixedly provided with a cable fastening block 49. Space between the cable fastening base block 48 and the cable fastening block 49 is used for the optical fiber cable to be threaded through, and the cable fastening block 49 and the cable fastening cylinder 47 are close to each other to fasten the optical fiber cable through work of the cable fastening cylinder 47.

In order to facilitate reliable work of the cable fastening cylinder 47. In practical use, a detecting sensor can be installed at the cable fastening assembly for sensing whether the optical fiber cable is threaded through the space between the cable fastening base block 48 and the cable fastening block 49. When the optical fiber cable is detected to be threaded through the space between the cable fastening base block 48 and the cable fastening block 49, the cable fastening cylinder 47 works to fasten the optical fiber cable tightly.

As shown in FIG. 5 and FIG. 7, in this embodiment, the optical fiber cable fixing mechanism 38 includes:

a nailing cylinder 50, installed at the first stuff receiving arm 33; and a first nailing gun 51, fixed at a piston rod 112 of the nailing cylinder 50 and used to fix the optical fiber cable at one of the supporting disks 27 of the tray after the pre-reservation of the optical fiber cable is finished.

When the pre-reservation at the inner end of the end of the optical fiber cable is finished through the optical fiber cable pre-reserving mechanism 37, a U-shaped nail is ejected through the first nailing gun 51 to fix the inner end of the optical fiber cable at one of the supporting disks 27 of the tray.

In practical use, a runner can be disposed at the first stuff receiving arm 33, and the nailing cylinder 50 is slidably disposed at the runner. The optical fiber cable fixing mechanism 38 includes a driving structure configured to drive the nailing cylinder 50 to move along the runner or includes a fixing structure configured to fix the nailing cylinder 50 at the runner. The disposing of the runner can change the position of the nailing cylinder 50 thereby adapting to trays with different sizes. In practical use, the driving structure can be a cylinder or a lead screw pair, and the fixing structure can be a fastener.

As shown in FIG. 5 and FIG. 7, in this embodiment, the gantry 31 has a first rack 52, a second gear 116 and a second motor 53 driving the second gear 116 to rotate are installed at each of the two stuff receiving arms, and the second gears 116 engage with the first rack 52. The corresponding stuff receiving arm is driven to move on the first rail 32 when the second motor 53 rotates.

As shown in FIG. 7, in this embodiment, the cable rolling motor 36 is installed at the first stuff receiving arm 33; and the unidirectional transmission structure 40 includes:

a ratchet 54, coaxially fixed at the chunk head 35 on the first stuff receiving arm 33;

a pawl 55, rotatably installed at the toothed disk 39; and an elastic member 115, used to allow the pawl 55 to have a tendency to rotate toward the ratchet 54.

In order to make the tray be driven to rotate by the chunk head 35 on the first stuff receiving arm 33 more reliably, preferably, the chunk head 35 on the first stuff receiving arm 33 has a limiting post 56, and one of the supporting disks 27 of the tray has a limiting hole 30 matching with the limiting post 56.

As shown in FIG. 5 and FIG. 6, in this embodiment, the cable rolling device 10 further includes two tray conveying rails 57 arranged side by side, a tray conveying seat 58 able to be lifted is movably installed at each of the two tray conveying rails 57, and the tray conveying seats 58 are used to support trays 25.

Two tray conveying rails 57 arranged side by side are disposed to cooperate with two stuff receiving arms moving on the first rail 32, such that the stuff receiving arms can work above any of the tray conveying rails 57, and the two tray conveying seats 58 can cooperate with each other. One tray conveying seat 58 can convey a finished tray with the rolled optical fiber cable, and the other tray conveying seat 58 can convey an empty tray. This structure can achieve continuous production, which greatly improves the production efficiency.

Figure 8:
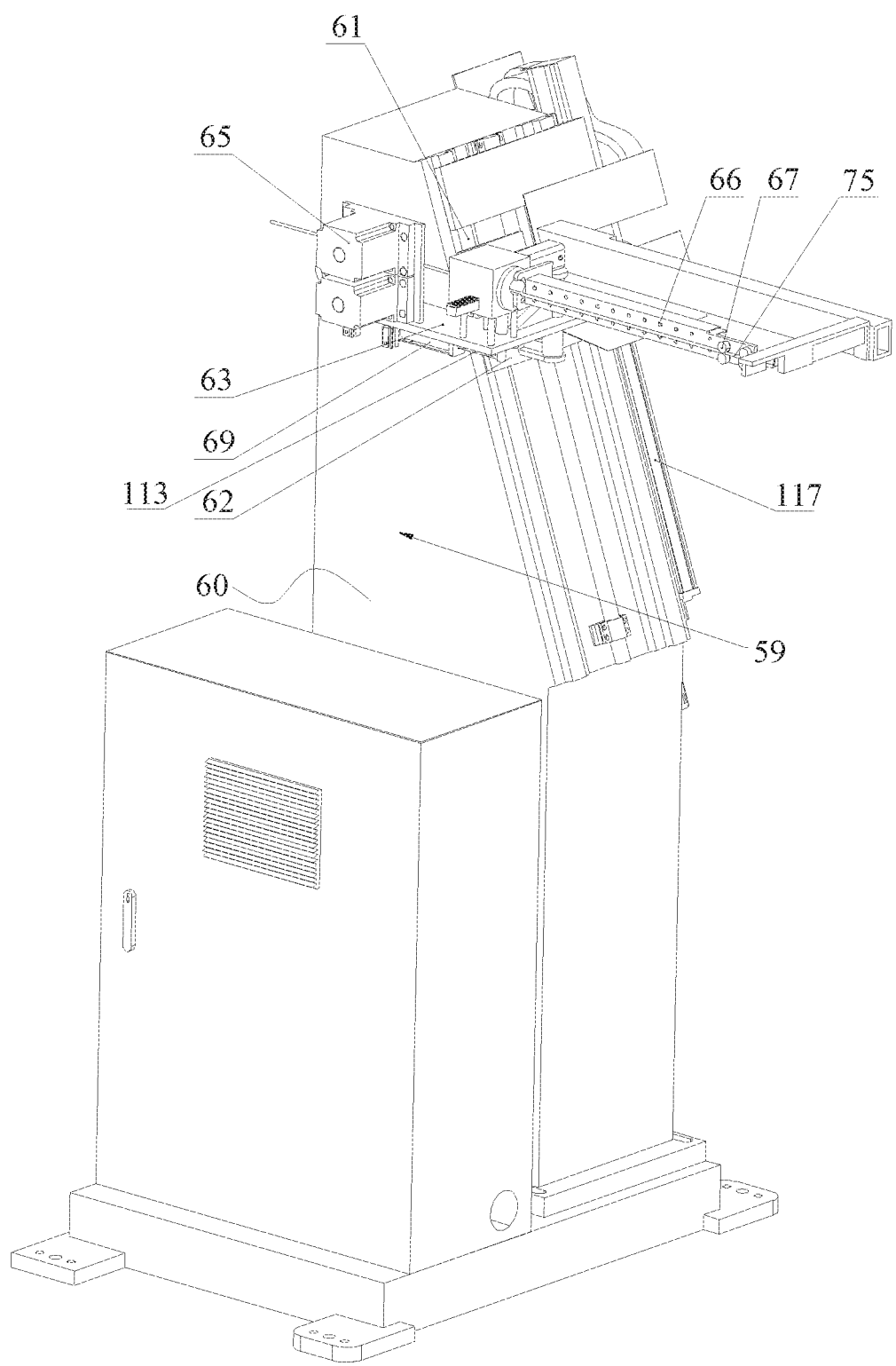
FIG. 8 is a schematic diagram of a cable threading mechanism.
Figure 9:
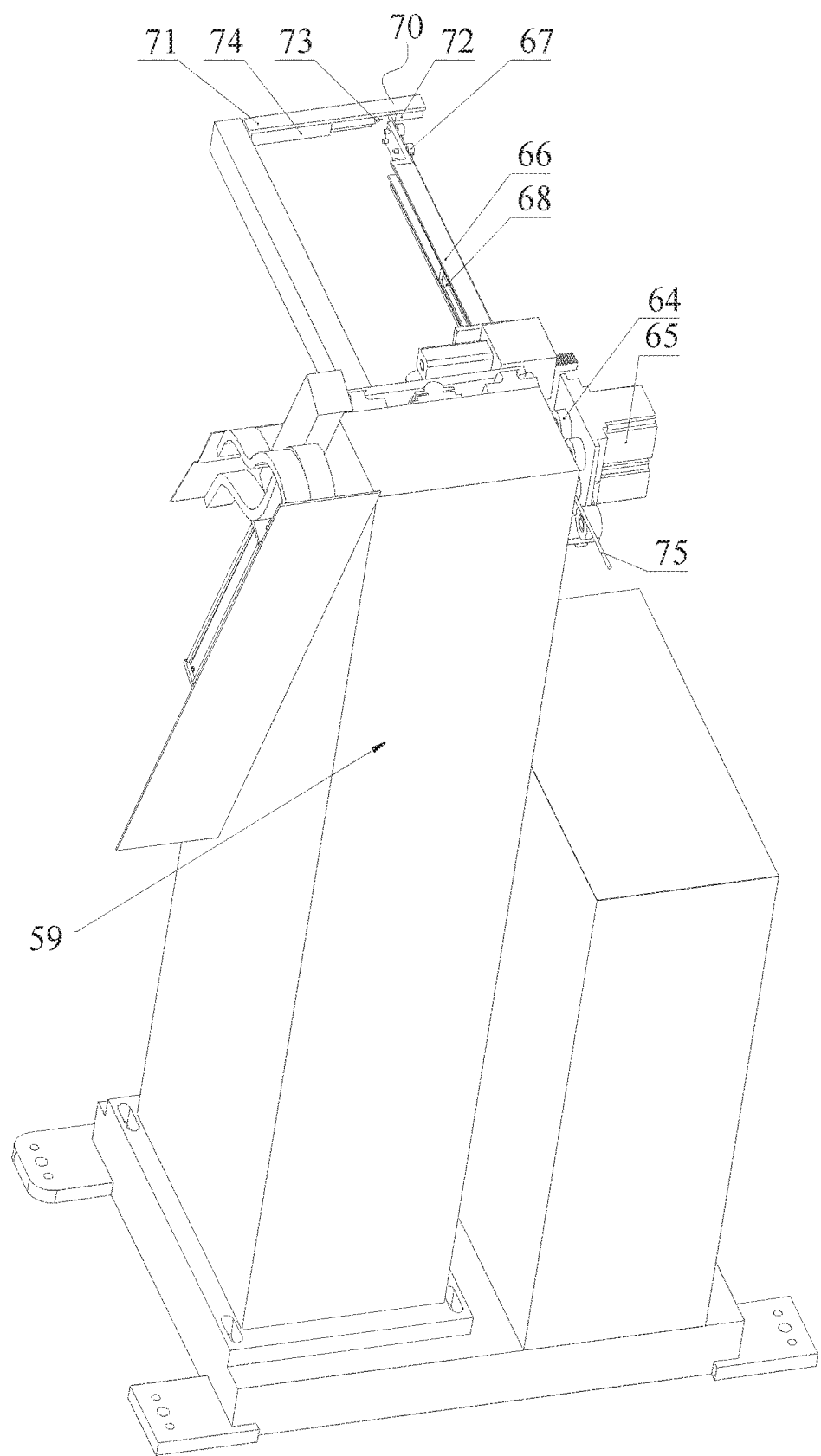
FIG. 9 is a schematic diagram of the cable threading mechanism from another angle.

As shown in FIG. 5, FIG. 8, and FIG. 9, in this embodiment, the cable rolling device 10 further includes a cable threading mechanism 59, and the cable threading mechanism 59 includes:

a first machine frame 60, disposed at one side of the gantry 31 wherein the first machine frame 60 has a second rail 61 disposed vertically or obliquely;

a first lift seat 62, movably disposed at the second rail 61;

a first driving mechanism 117, configured to drive the first lift seat 62 to move on the second rail 61;

a rotating seat 63, rotatably installed at the first lift seat 62;

a first cable guiding wheel group 64, installed at the rotating seat 63 and used for the optical fiber cable to pass through;

a third motor 65, configured to drive the first cable guiding wheel group 64 to work and to drive the optical fiber cable located in the first cable guiding wheel group 64 to move;

a retractable tube 66, installed at the rotating seat 63, wherein an end of the retractable tube 66 has a second cable guiding wheel group 67, and the second cable guiding wheel group 67 is configured to receive the optical fiber cable from the first cable guiding wheel group 64;

a retractable cylinder 68, configured to (hive the retractable tube 66 to extend or retract, such that the second cable guiding wheel group 67 is close to or away from the tray; and a second cylinder 69, wherein a cylinder body 113 of the second cylinder 69 is rotatably installed at the first lift seat 62, a piston rod of the second cylinder 69 is rotatably connected with the rotating seat 63, and the second cylinder 69 is configured to drive the rotating seat 63 to rotate.

The first driving mechanism 117 may adopt any of the existing driving mechanisms, such as a rack and pinion combination, a transmission belt structure, a lead screw pair structure and so on, and the first driving mechanism 117 can precisely control the position at which the first lift seat 62 is located on the second rail 61 through a servo motor.

Both the first cable guiding wheel group 64 and the second cable guiding wheel group 67 include guide wheels arranged up and down, and the optical fiber cable passes between the guide wheels. The working principle of the cable threading mechanism 59 is as follows. The first driving mechanism 117 can control the lifting of the first lift seat 62, such that the optical fiber cable on the retractable tube 66 and the cable threading hole 29 of the tray are substantially in the same plane. The second cylinder 69 works, and the piston rod 113 of the second cylinder 69 extends to chive the rotating seat 63 to rotate by a set angle. At this time, the optical fiber cable on the retractable tube 66 is exactly aligned with the cable threading hole 29 of the tray, then the retractable cylinder 68 works to drive the second cable guiding wheel group 67 to be close to the tray. The first cable guiding wheel group 64 and the second cable guiding wheel group 67 work, such that the optical fiber cable can be reliably threaded through the cable threading hole 29 of the tray.

In practical use, preferably, when the piston rod 113 of the second cylinder 69 retracts, a central line of the retractable tube 66 is perpendicular to the axis of the chunk head 35. A cable threading function can be automatically realized and trays with different sizes can be adapted through the cable threading mechanism 59 in this application.

In practical use, in order to facilitate rolling the optical fiber cable at the tray, the rotating seat 63 includes a lower seat and an upper seat. The upper seat can reciprocate relative to the lower seat, which can be realized by a rail and a driving member. At this time, the lower seat is rotatably installed at the first lift seat 62, the piston rod 113 of the second cylinder 69 is rotatably connected with the lower seat, and the first cable guiding wheel group 64, the third motor 65, the retractable tube 66, and the retractable cylinder 68 are all installed at the upper seat. This structure enables the upper seat to reciprocate when the optical fiber cable is rolled, thereby preventing the optical fiber cable from swinging left and right and reliably carrying out the rolling operation.

As shown in FIG. 8 and FIG. 9, in this embodiment, the cable threading mechanism 59 further includes a cable cutting assembly 70, and the cable cutting assembly 70 includes:

a cable cutting rod 71, installed at the first machine frame 60, wherein the cable cutting rod 71 has a fixed blade 7;

a cutting blade 73, slidably installed at the cable cutting rod 71, wherein there is space between the cutting blade 73 and the fixed blade 72 for the optical fiber cable to pass through; and a cutting cylinder 74, installed at the cable cutting rod 71 and configured to drive the cutting blade 73 to move toward the fixed blade 72 thereby cutting the optical fiber cable between the cutting blade 73 and the fixed blade 72.

After rolling the optical fiber cable at the tray is finished, by controlling the first lift seat 62 to move, the optical fiber cable is located between the cutting blade 73 and the fixed blade 72. Then the cutting cylinder 74 drives the cutting blade 73 to move toward the fixed blade 72 and cuts the optical fiber cable between the cutting blade 73 and the fixed blade 72, and automatic cutting operation is achieved.

A whole workflow of the cable rolling device 10 is as follows.

The optical fiber cable is produced to a preset section-→The cable cutting assembly 70 works and cuts the optical fiber cable 75, and the cable fastening cylinder 47 works such that the cable fastening block 49 is away from the cable fastening base block 48→The two stuff receiving arms are away from each other, and the finished tray with the rolled optical fiber cable falls into one of the tray conveying seats 58 and is conveyed by the tray conveying rails 57→An empty tray on the other tray conveying seat 58 is carried in, and the two stuff receiving arms cooperate with each other to clamp the empty tray tightly and make the cable threading hole 29 of the tray be located at an upper position of the tray→The second cylinder 69 works such that the rotating seat 63 rotates, and the optical fiber cable on the retractable tube 66 is exactly aligned with the cable threading hole 29 of the tray→The retractable tube 66 works such that the second cable guiding wheel group is close to the tray→The third motor 65 works, and the end at the inner end of the optical fiber cable is threaded through the cable threading hole 29, such that the end at the inner end of the optical fiber cable passes through the space between the cable fastening base block 48 and the cable fastening block 49→The cable fastening cylinder 47 works and fastens the end at the inner end of the optical fiber cable tightly→The first cylinder 43 works such that the first gear 42 engages with the toothed disk 39→The first motor 41 rotates and drives the toothed disk 39 to rotate, and the third motor 65 works synchronously at this time→The cable fastening assembly 44 drives the optical fiber cable to be pre-wound at the outside of the positioning blocks 46→After the optical fiber cable is pre-wound by a preset length (1-10 m), the first motor 41 stops rotating→The U-shaped nail is ejected by the first nailing gun 51 thereby fixing the inner end of the optical fiber cable at one of the supporting disks 27 of the tray→The automatic cable threading and the pre-reservation at the inner end of the optical fiber cable are finished→The first cylinder 43 works such that the first gear 42 is separated from the toothed disk 39→The retractable cylinder 68 retracts, and the retractable tube 66 retracts→The second cylinder 69 retracts, the rotating seat 63 is reset, at the same time the stuff receiving arms move horizontally toward the retractable tube 66 along a beam of the gantry 31, and rotating and resetting extent of the rotating seat 63 is consistent with horizontally moving extent of the stuff receiving arms→The rotating seat 63 is reset to an initial position (the central line of the retractable tube 66 is perpendicular to the axis of the chunk head 35)→Each mechanism finish resetting→The cable rolling motor 36 rotates and drives the chunk head 35 such that the tray is driven to rotate→The automatic cable rolling starts, and the optical fiber cable pre-reserving mechanism 37 rotates synchronously with the chunk head 35.

In practical use, in order to facilitate rolling the optical fiber cable, the whole cable threading mechanism 59 can be controlled to reciprocate horizontally, and only the first cable guiding wheel group 64, the third motor 65, and the retractable tube 66 can also be controlled to reciprocate horizontally, that is, the rotating seat 63 is the structure including the upper seat and the lower seat described above.

Figure 10:
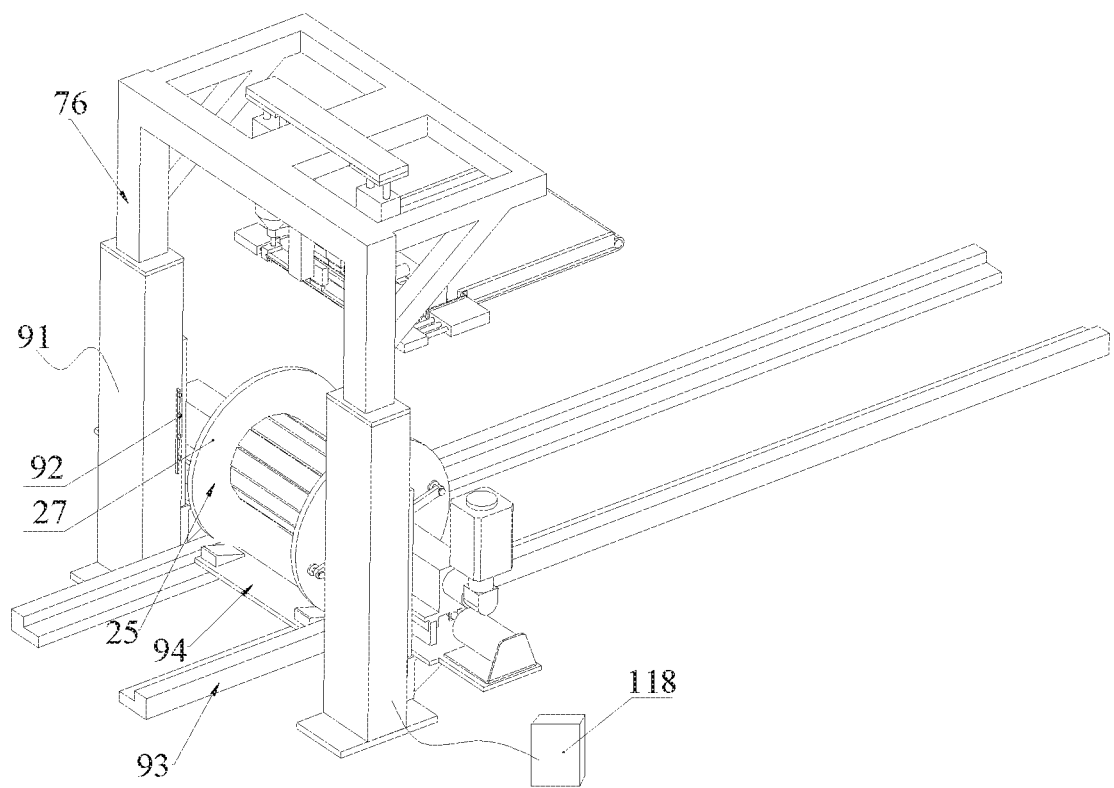
FIG. 10 is a structural schematic diagram of a sealing device.
Figure 11:
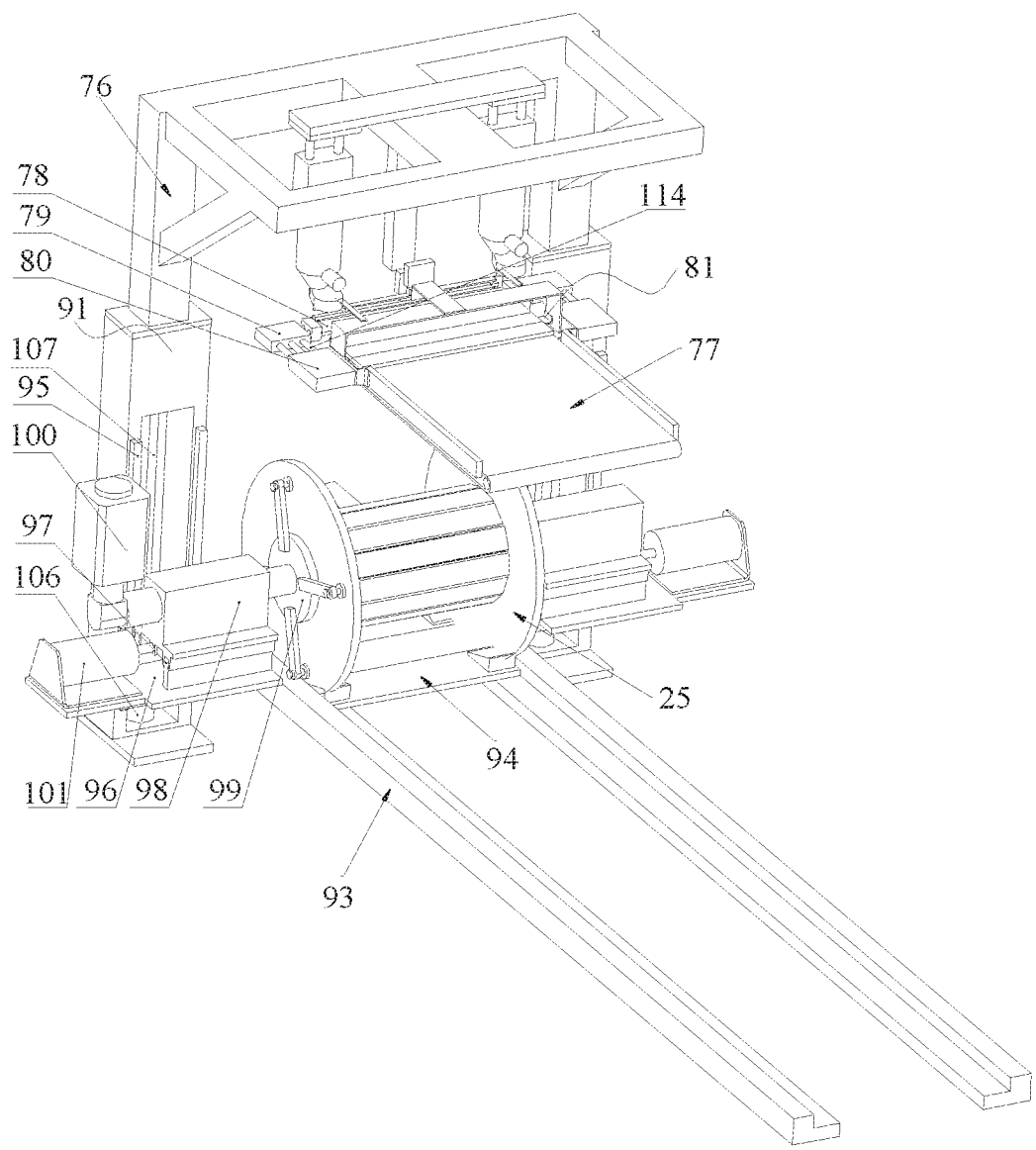
FIG. 11 is a structural schematic diagram of the sealing device from another angle.
Figure 12:
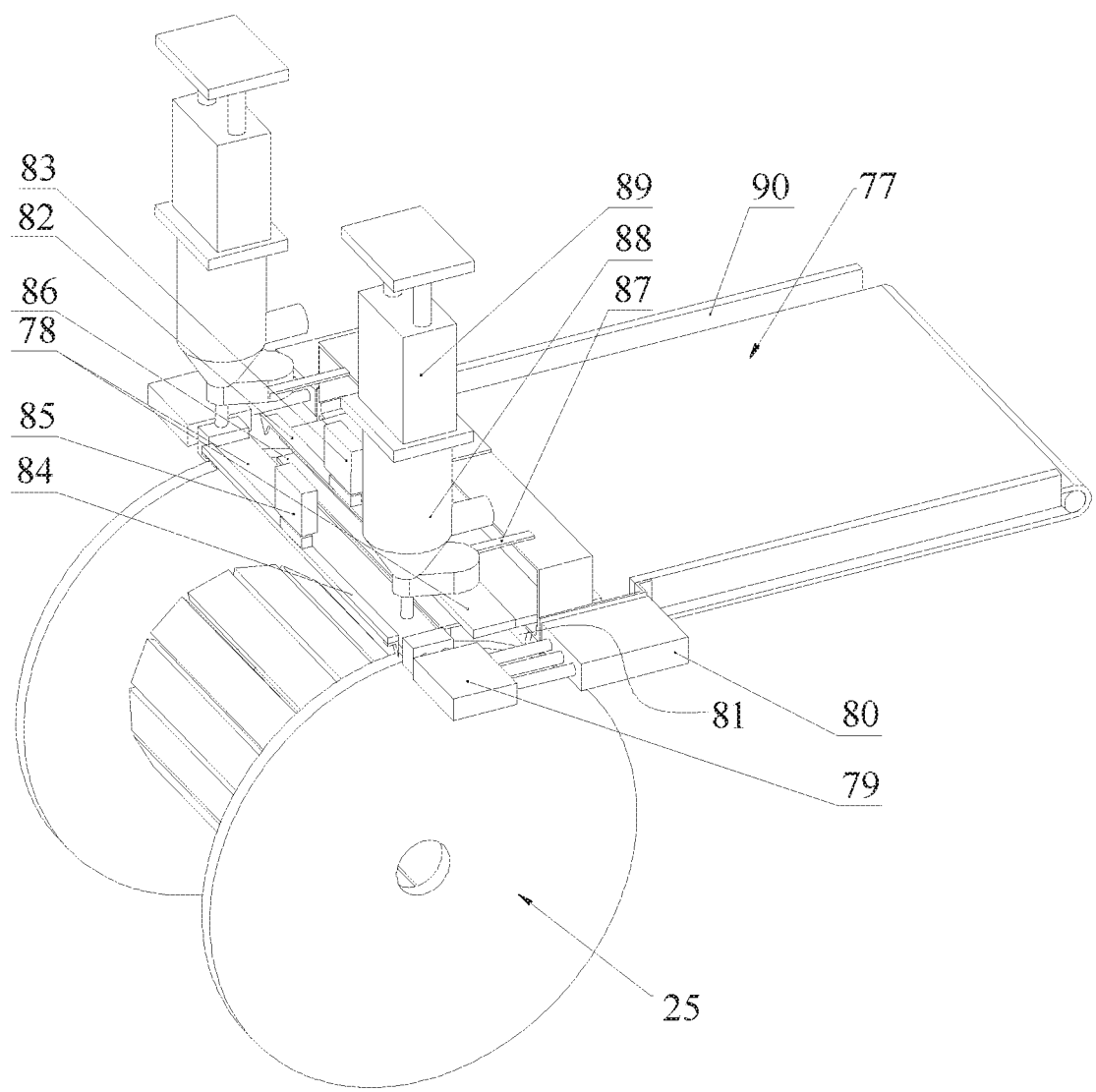
FIG. 12 is a partial structural schematic diagram of the sealing device.

The finished tray rolled with the optical fiber cable from the cable rolling device is first checked and then conveyed to the sealing device for sealing after the finished tray rolled with the optical fiber cable is qualified, as shown in FIG. 10 FIG. 11, and FIG. 12 the sealing device 11 in this embodiment includes:

a second machine frame 76;

a conveyor belt 77, installed at the second machine frame 76 and used for conveying the sealing plate 78, wherein one end of the conveyor belt 77 is a conveying out end 81;

a first stopping needle 82, movably disposed at a front end of the conveying out end 81 and used for cooperating with the first piece of the sealing plate 78 from the conveying out end 81 thereby preventing the sealing plate 78 from moving outside;

a first lift mechanism 83, installed at the second machine frame 76 and configured to drive the first stopping needle 82 to move up and down, wherein the first stopping needle 82 no longer blocks the sealing plate 78 when the first lift mechanism 83 drives the first stopping needle 82 to move upward;

two third cylinders 79, disposed at two sides of the conveying out end 81 of the conveyor belt 77, wherein the two third cylinders 79 cooperate with each other and are configured to tighten the first piece of the sealing plate 78 from the conveying out end 81;

two fourth cylinders 80, installed at two sides of the conveyor belt 77, respectively, wherein the fourth cylinders 80 correspond to and cooperate with the third cylinders 79 one by one, a piston rod 114 of each of the fourth cylinders 80 is fixed with the corresponding third cylinder 79, and the two fourth cylinders 80 cooperate with each other and are configured to drive the two third cylinders 79 and the sealing plate 78 tightened by the third cylinders 79 to move away from the conveyor belt 77;

second nailing guns 88, used to make the sealing plate 78 conveyed from the fourth cylinders 80 fixed at the supporting disks 27 of the finished tray rolled with the optical fiber cable; and third lift mechanisms 89, installed at the second machine frame 76 and configured to drive the second nailing guns 88 to move up and down.

"The front end of the conveying out end 81" refers to one end along a conveying direction of the conveyor belt 77. The first piece of the sealing plate 78 described in this application refers to the foremost sealing plate 78 not conveyed by the fourth cylinders 80, that is, the original second piece of the sealing plate 78 becomes the first piece of the sealing plate 78 when the sealing plate 78 is conveyed by the fourth cylinders 80 for one time.

In order to increase the work efficiency, preferably, there are two second nailing guns 88 located above corresponding supporting disks 27, respectively.

As shown in FIG. 10, FIG. 11, and FIG. 12, in this embodiment, the sealing device 11 further includes a controller 118 controlling operation of the first lift mechanism 83, the third lift mechanisms 89, the third cylinders 79, the fourth cylinders 80, the conveyor belt 77, and the second nailing guns 88, and first photoelectric sensors 87 disposed above two sides of the conveying out end 81 of the conveyor belt 77. The first photoelectric sensors 87 are electrically connected with the controller 118 and are configured to detect whether the first piece of the sealing plate 78 from the conveying out end 81 is in place.

The two first photoelectric sensors 87 can detect whether two sides of the first piece of the first sealing plate 78 are in place, and a signal is sent to the controller 118 after both the two sides are in place. The controller 118 controls the conveyor belt 77 to stop rotating and then controls the first lift mechanism 83, the third cylinders 79, the fourth cylinders 80, the third lift mechanisms 89, and the second nailing guns 88 to work.

As shown in FIG. 12, in this embodiment, the front end of the conveying out end 81 of the conveyor belt 77 has a storing plate 86, there is a gap between the first stopping needle 82 and the storing plate 86, and the first photoelectric sensors 87 are configured to emit infrared rays to the gap thereby detecting whether corresponding sides of the sealing plate 78 are in place.

When the sealing plate 78 is in place, the first piece of the sealing plate 78 will cover the gap. At this time, if both the left first photoelectric sensor 87 and the right first photoelectric sensor 87 have a sense, it indicates that the sealing plate 78 is already in place, and the controller 118 can control the conveyor belt 77 to stop rotating according to the signal of the first photoelectric sensors 87.

Each of the first photoelectric sensors 87 is a diffuse reflection sensor, other sensors capable of detecting the sealing plate 78 can be adopted In practical use.

As shown in FIG. 12, in this embodiment, the sealing device 11 further includes:

a second stopping needle 84, movably disposed at a front end of the first stopping needle 82 and used to cooperate with the sealing plate 78 conveyed by the fourth cylinders 80 thereby limiting a position of the sealing plate 78; and a second lift mechanism 85, configured to drive the second stopping needle 84 to move up and down, wherein the second stopping needle 84 no longer blocks the sealing plate 78 conveyed by the fourth cylinders 80 when the second lift mechanism 85 drives the second stopping needle 84 to move upward.

"The front end of the first stopping needle 82" refers to one end along the conveying direction of the conveyor belt 77. In practical operation, preferably, the second stopping needle 84 is located directly above an uppermost edge of the supporting disks 27. The working principle of the second stopping needle 84 is as follows. The second lift mechanism 85 makes the second stopping needle 84 be in a low position, at this time the sealing plate 78 conveyed by the fourth cylinders 80 cooperates with the second stopping needle 84, and the second stopping needle 84 can limit the position of the sealing plate 78. After work of the second nailing guns 88 is finished, and the second lift mechanism 85 drives the second stopping needle 84 to move upward, the finished tray rolled with the optical fiber cable is controlled to rotate by a set angle. By disposing the second lift mechanism 85 and the second stopping needle 84, the sealing plate 78 will be stopped by the second stopping needle 84 before being fixed at the supporting disks 27 by the second nailing guns 88, such that a gap between each two adjacent sealing plates 78 fixed at the supporting disks 27 is a certain value, which has high precision. In practical use, if no gap is required between each two adjacent sealing plates 78, it is only necessary to control the third lifting mechanisms 89, such that the second stopping needle 84 is kept in a relative high position.

As shown in FIG. 12, in this embodiment, each of two sides of the conveyor belt 77 has a limiting side plate 90; and the first lift mechanism 83, the second lift mechanism 85, and the third lift mechanisms 89 are all cylinders.

The limiting side plates 90 can limit a left position and a right position of the sealing plate 78, and the first lift mechanism 83, the second lift mechanism 85, and the third lift mechanisms 89 are all cylinders. This structure is simple.

As shown in FIG. 10 and FIG. 11, in this embodiment, the second machine frame 76 includes two upright posts 91, and each of the upright posts 91 has a vertical guide rail 95. The sealing device 11 further includes two seat tightening assemblies and two lift assemblies. The seat tightening assemblies are movably disposed at the corresponding vertical guide rails 95 and are used to tighten and drive the finished tray rolled with the optical fiber cable to rotate. The lift assemblies are used to drive the corresponding seat tightening assemblies to move up and down along the vertical guide rails 95. Each of the seat tightening assemblies includes:

a second lift seat 96, slidably disposed at the corresponding vertical guide rail 95, wherein the second lift seat 96 has a horizontal guide rail 97;

a horizontal moving seat 98, slidably disposed at the horizontal guide rail 97;

a tightening disk 99, rotatably installed at the horizontal moving seat 98, wherein the tightening disk 99 is used to cooperate with a side wall of one of the supporting disks 27 of the finished tray rolled with the optical fiber cable;

a first servo motor 100, configured to drive the tightening disk 99 to rotate; and a fifth cylinder 101, installed at the second lift seat 96 and configured to drive the horizontal moving seat 98 to reciprocate along the horizontal guide rail 97; and two seat tightening assemblies cooperate with each other and are used to tightening two supporting disks 27 of the finished tray rolled with the optical fiber cable, respectively.

When the seat tightening assemblies work, the fifth cylinders 101 work and push the horizontal moving seats 98 to move toward the finished tray rolled with the optical fiber cable, such that the two tightening disks 99 tighten two supporting disks 27 of the finished tray rolled with the optical fiber cable, respectively. At this time, the lift assemblies drive the finished tray rolled with the optical fiber cable to move up and down, and the finished tray rolled with the optical fiber cable can be driven by the first servo motors 100 to rotate precisely.

As shown in FIG. 11, in this embodiment, each of the lift assemblies is a lead screw pair, and each of the lift assemblies includes:

a lead screw 107, rotatably installed at the upright post 91, wherein the second lift seat 96 has a nut cooperating with the lead screw 107 through a thread; and a second servo motor 106, configured to drive the lead screw 107 to rotate thereby driving the seat tightening assembly to move up and down.

Figure 13:
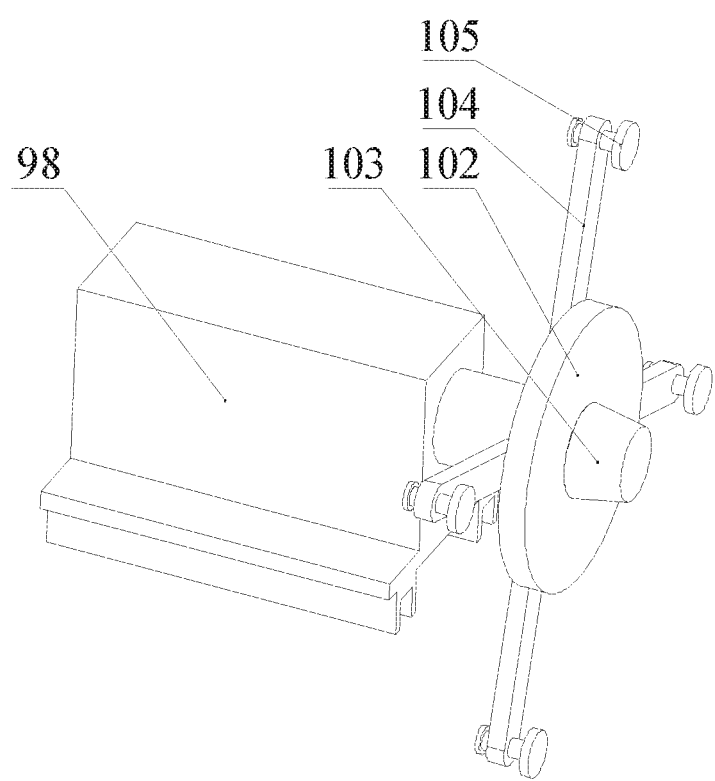
FIG. 13 is a schematic diagram of a horizontal moving seat and a tightening disk.

As shown in FIG. 11 and FIG. 13, in this embodiment, each of the tightening disks 99 includes:

a disk body 102;

a positioning protrusion 103, fixed at a middle section of the disk body 102 and used to cooperate with one of the positioning holes 28 of the finished tray rolled with the optical fiber cable for positioning; and a plurality of auxiliary rods 104, fixed at the disk body 102 and uniformly arranged around an axis of the disk body 102, wherein an end of each of the auxiliary rods 104 has an elastic sucker 105.

Reliable positioning can be achieved through the positioning protrusions 103, and the seat tightening assemblies tighten the finished tray rolled with the optical fiber cable tightly by pressure. Then the finished tray rolled with the optical fiber cable is driven to rotate by friction, and there is no need to dispose a shift fork hole. The auxiliary rods 104 and elastic suckers 105 are disposed thereby ensuring that the finished tray rolled with the optical fiber cable is reliably driven to rotate.

In practical use, each of the elastic suckers 105 is connected with a pipe, which sucks air and removes the air to achieve sucking and releasing the tray. In practical use, preferably, an end face of each of the disk bodies 102 cooperating with one of the supporting disks 27 has an uneven structure, and the uneven structure can increase the friction.

As shown in FIG. 10, in this embodiment, the sealing device 11 further includes a controller 118 and a plurality of second photoelectric sensors 92 disposed at the upright posts 91 spaced apart from each other up and down. The second photoelectric sensors 92 and the second servo motors 106 are electrically connected with the controller 118, and each of the second photoelectric sensors 92 is configured to detect a height range of the supporting disks 27 of the finished tray rolled with the optical fiber cable.

As different optical fiber cables have different diameters and lengths, the sizes of used trays are also different. Take the optical fiber cable as an example. The supporting disks 27 at both sides of a common wooden tray have diameters of 800 mm, 900 mm, 1000 mm and so on. In this application, by disposing a plurality of second photoelectric sensors 92 spaced apart from each other up and down, a plurality of second photoelectric sensors 92 can be triggered when the finished tray rolled with the optical fiber cable is just transported to the second photoelectric sensors 92. As different finished trays rolled with the optical fiber cable have different sizes, the numbers of triggered second photoelectric sensors 92 are also different. Therefore, the size of the finished tray rolled with the optical fiber cable can be determined according the number of the triggered second photoelectric sensors 92, such that a rising distance and so on of the seat tightening assemblies can be determined. This application is more applicable.

In practical use, each of the second photoelectric sensors 92 may be a diffuse reflection sensor or may also be an active infrared intrusion sensor and so on.

As shown in FIG. 10 and FIG. 11, in this embodiment, the sealing device 11 further includes:

tray transporting rails 93, disposed below the conveyor belt 77; and a transporting seat 94, movably disposed on the tray transporting rails 93 and used to support the finished tray rolled with the optical fiber cable.

The specific working principle of the sealing device 11 in this embodiments as follows.

The finished tray rolled with the optical fiber cable is placed on the transporting seat 94, and the transporting seat 94 moves on the tray transporting rails 93. When the transporting seat 94 moves to the sides at which the posts 91 are located, the finished tray rolled with the optical fiber cable will trigger a plurality of second photoelectric sensors 92. As the sizes of the finished trays rolled with the optical fiber cable are different, the numbers of triggered second photoelectric sensors 92 are different. The controller 118 determines the size of the finished tray rolled with the optical fiber cable according to the number of triggered second photoelectric sensors 92, such that control parameters can be self-adaptively adjusted.

The fifth cylinders 101 of the two seat tightening assemblies work and push the horizontal moving seats 98 to move toward the finished tray rolled with the optical fiber cable, such that two tightening disks 99 tighten two supporting disks 27 of the finished tray rolled with the optical fiber cable, respectively. At this time, the lift assemblies drive the finished tray rolled with the optical fiber cable to move upward, and finally an upper edge of each of the supporting disks 27 of the finished tray rolled with the optical fiber cable is tangent to a lower edge of the first piece of the sealing plate 78.

The conveyor belt 77 works and drives a plurality of sealing plates 78 to move toward the conveying out end 81. When two first photoelectric sensors 87 detect that two sides of the sealing plate 78 are in place, the signal is sent to the controller 118, and the controller 118 controls the conveyor belt 77 to stop rotating. Then the first lift mechanism 83 works and drives the first stopping needle 82 to move upward, and the first stopping needle 82 no longer blocks the first piece of the sealing plate 78. At this time, two third cylinders 79 work to tighten the first piece of the sealing plate 78, and then the piston rod 114 of each of the fourth cylinders 80 extends thereby driving the two third cylinders 79 and the sealing plate 78 tightened by the two third cylinders 79 to move away from the conveyor belt 77 until the second stopping needle 84 cooperates. The second stopping needle 84 can limit the position of this sealing plate 78.

The third lift mechanisms 89 work and drive the second nailing guns 88 to move downward, and the second nailing guns 88 work and make the sealing plate 78 be fixed at the supporting disks 27 of the finished tray rolled with the optical fiber cable. After the work of the second nailing guns 88 is finished, other components are reset. The second lift mechanism 85 first drives the second stopping needle 84 to move upward. After the first servo motors 100 control the finished tray rolled with the optical fiber cable to rotate by a set angle, the second lift mechanism 85 controls the second stopping needle 84 to move downward.

Repeat the above-mentioned action until the last piece of the sealing plate 78 is fixed at the supporting disks of the finished tray rolled with the optical fiber cable. As the diameter of the tray body increases after adding the sealing plates 78, when the last piece of the sealing plate 78 is transported, it is necessary to move the whole tray down a distance of the sealing plate 78 and then carry out the operation. Finally sealing plates 78 are fixed around the tray, and the whole sealing work is finished.

The sealing plate 78 is tightened by two third cylinders 79 in this application, which has high reliability, long service life, and low maintenance cost compared with a way of using a foam sucker. After the third cylinders 79 tighten the sealing plate 78, the sealing plate 78 can be directly conveyed to the corresponding position of the finished tray rolled with the optical fiber cable by the fourth cylinders 80. The stroke of this structure is short, the whole action is simple, and the efficiency is higher. By disposing the second lift mechanism 85 and the second stopping needle 84, the sealing plate 78 will be stopped by the second stopping needle 84 before being fixed at the supporting disks 27 by the second nailing guns 88, such that the gap between each two adjacent sealing plates 78 fixed at the supporting disks 27 is a certain value, which has the high precision. In practical use, if no gap is required between each two adjacent sealing plates 78, it is only necessary to control the third lifting mechanisms 89, such that the second stopping needle 84 is kept in the relative high position.

In the method for continuously producing the optical fiber cable of this embodiment, by disposing the first cable storing device 1, the cable core producing process and the sheathing process can be combined for production, and conveying of the cable core semi-finished product can be avoided. The adopted cable rolling device 10 can achieve automatic cable threading, automatic cable winding, and automatic tray loading and tray unloading. The adopted sealing device can automatically seal the finished tray rolled with the optical fiber cable. The whole system is highly intelligent, which can greatly improve the production efficiency.

The above-mentioned description is only a preferred embodiment of this invention and does not limit a patent protection scope of this invention. Equivalent structural variants made by using the description of this invention and contents of the accompany drawings are directly or indirectly applied to other related technical fields and are equally included in the protection scope of this invention.

What is claimed is:

1. A system of continuously producing an optical fiber cable, comprising:
    cable core producing equipment, used to produce a cable core;
    a first cable storing device, used to receive and store the cable core from the cable core producing equipment;
    a sheath extrusion device, used to receive the cable core from the first cable storing device and cover a sheath at an exterior of the cable core, wherein an optical fiber cable is obtained by processing;
    a cable rolling device, used to receive the optical fiber cable from the sheath extrusion device and roll the optical fiber cable at a tray, wherein a finished tray rolled with the optical fiber cable is obtained; and
    a sealing device, wherein the sealing device is used to fix sealing plates at the finished tray rolled with the optical fiber cable by nailing the sealing plates to a plurality of supporting disks to surround a rolled optical fiber cable,
    wherein the cable rolling device comprises:
    a gantry, wherein the gantry has a first rail;
    two stuff receiving arms, slidably disposed at the first rail, wherein the two stuff receiving arms are a first stuff receiving arm and a second stuff receiving arm, respectively, and two chunk heads are rotatably installed at opposite sides of the two stuff receiving arms, respectively;
    a cable rolling motor, installed at one of the stuff receiving arms and configured to drive the chunk head on the stuff receiving arm at which the cable rolling motor is located to rotate;
    an optical fiber cable pre-reserving mechanism, installed at the first stuff receiving arm and configured to receive the optical fiber cable threaded through a cable threading hole of a tray and allow the optical fiber cable to be pulled out from the cable threading hole for pre-reservation a set length; and
    an optical fiber cable fixing mechanism, installed at the first stuff receiving arm and configured to fix the optical fiber cable at one of the supporting disks of the tray after the optical fiber cable is pre-reserved;
    wherein the optical fiber cable pre-reserving mechanism comprises:
    a toothed disk, rotatably installed at the first stuff receiving arm and coaxial with the chunk head on the first stuff receiving arm, wherein a unidirectional transmission structure is disposed between the toothed disk and the chuck head on the first stuff receiving arm, the toothed disk rotates relative to the chuck head when the toothed disk rotates in a first direction, the chuck head is configured to be driven to rotate synchronously when the toothed disk rotates in a second direction, and the first direction is opposite to the second direction;
    a first motor, movably installed at the first stuff receiving arm, wherein a first gear is installed at an output shaft of the first motor;
    a first cylinder, installed at the first stuff receiving arm and configured to control movement of the first motor, such that the first gear of the first motor engages with the toothed disk or the first gear is separated from the toothed disk; and
    a cable fastening assembly, installed at the toothed disk and configured to fasten the optical fiber cable from the cable threading hole of the tray.

2. The system of continuously producing the optical fiber cable according to claim 1, wherein the first cable storing device is an active type cable storing device, and the first cable storing device comprises:
    supporting frames, wherein a first guide rail is installed at each of the supporting frames;
    a cable storing fixed wheel, rotatably installed at the supporting frames;
    a first moving block, movably disposed at the first guide rails, wherein the first moving block is configured to reciprocate along the first guide rails;
    a cable storing moving wheel, rotatably installed at the first moving block;
    a tension frame, fixed relative to the supporting frames, wherein a second guide rail is installed at the tension frame;
    a tension fixed wheel, rotatably installed at the tension frame;
    a second moving block, movably disposed at the second guide rail, wherein the second moving block is configured to reciprocate along the second guide rail;
    a tension moving wheel, rotatably installed at the second moving block;
    an elastic mechanism, used to make the tension moving wheel have a tendency to move away from the tension fixed wheel;
    a displacement sensor, installed at the tension frame and configured to detect position information of the tension fixed wheel;

a moving wheel driving mechanism, configured to drive the first moving block to move on the first guide rails according to a signal of the displacement sensor; and wherein the first cable storing device further comprises a guide pulley rotatably installed at the tension frame, and the cable core is wound at the tension fixed wheel and the tension moving wheel after passing through the guide pulley.

3. The system of continuously producing the optical fiber cable according to claim 1, wherein the cable core producing equipment comprises a strength member cable releasing device, a unitube cable releasing device, a filler cable releasing device, a yarn stranding device, and a yarn binding device;

a metal band welding device is disposed between the first cable storing device and the sheath extrusion device, and the metal band welding device is used to receive the cable core from the first cable storing device and to weld a metal band around the cable core; and a second cable storing device is disposed between the sheath extrusion device and the cable rolling device, the second cable storing device is used to receive and store the optical fiber cable from the sheath extrusion device and to convey the optical fiber cable to the cable rolling device.

4. The system of continuously producing the optical fiber cable according to claim 1, wherein a plurality of positioning guide rods are disposed around the toothed disk, a positioning block is installed at each of the positioning guide rods, each of the positioning blocks has the same distance from an axis of the toothed disk, a distance between a position where the cable fastening assembly fastens the optical fiber cable and the axis of the toothed disk is greater than or equal to a distance between each of the positioning blocks and the axis of the toothed disk, and the positioning blocks are used to support the optical fiber cable thereby facilitating winding of pre-reserved optical fiber cable.

5. The system of continuously producing the optical fiber cable according to claim 4, wherein the cable fastening assembly comprises a cable fastening cylinder fixed at the toothed disk, the cable fastening cylinder is fixedly provided with a cable fastening base block, a piston rod of the cable fastening cylinder is fixedly provided with a cable fastening block, space between the cable fastening base block and the cable fastening block is used for the optical fiber cable to be threaded through, and the cable fastening block and the cable fastening cylinder are close to each other to fasten the optical fiber cable through work of the cable fastening cylinder;

wherein the optical fiber cable fixing mechanism comprises:

a nailing cylinder, installed at the first stuff receiving arm; and a first nailing gun, fixed at a piston rod of the nailing cylinder and used to fix the optical fiber cable at one of the supporting disks of the tray after the pre-reservation of the optical fiber cable is finished;

a cable rolling motor being installed at the first stuff receiving arm; wherein the unidirectional transmission structure comprises:

a ratchet, coaxially fixed at the chunk head on the first stuff receiving arm;

a pawl, rotatably installed at the toothed disk; and an elastic member, used to allow the pawl to have a tendency to rotate toward the ratchet.

6. The system of continuously producing the optical fiber cable according to claim 1, wherein the gantry has a first rack, a second gear and a second motor driving the second gear to rotate are installed at each of the two stuff receiving arms, and the second gears engage with the first rack; and the cable rolling device further comprises two tray conveying rails arranged side by side, a tray conveying seat able to be lifted is movably installed at each of the two tray conveying rails, and the tray conveying seats are used to support trays.

7. The system of continuously producing the optical fiber cable according to claim 1, wherein the cable rolling device further comprises a cable threading mechanism, and the cable threading mechanism comprises:

a first machine frame, disposed at one side of the gantry, wherein the first machine frame has a second rail disposed vertically or obliquely;

a first lift seat, movably disposed at the second rail;

a first driving mechanism, configured to drive the first lift seat to move on the second rail;

a rotating seat, rotatably installed at the first lift seat;

a first cable guiding wheel group, installed at the rotating seat and used for the optical fiber cable to pass through;

a third motor, configured to drive the first cable guiding wheel group to work and to drive the optical fiber cable located in the first cable guiding wheel group to move;

a retractable tube, installed at the rotating seat, wherein an end of the retractable tube has a second cable guiding wheel group, and the second cable guiding wheel group is configured to receive the optical fiber cable from the first cable guiding wheel group;

a retractable cylinder, configured to drive the retractable tube to extend or retract, such that the second cable guiding wheel group is close to or away from the tray; and a second cylinder, wherein a cylinder body of the second cylinder is rotatably installed at the first lift seat, a piston rod of the second cylinder is rotatably connected with the rotating seat, and the second cylinder is configured to drive the rotating seat to rotate.

8. The system of continuously producing the optical fiber cable according to claim 7, wherein the cable threading mechanism further comprises a cable cutting assembly, and the cable cutting assembly comprises:

a cable cutting rod, installed at the first machine frame, wherein the cable cutting rod has a fixed blade;

a cutting blade, slidably installed at the cable cutting rod, wherein there is space between the cutting blade and the fixed blade for the optical fiber cable to pass through; and a cutting cylinder, installed at the cable cutting rod and configured to drive the cutting blade to move toward the fixed blade thereby cutting the optical fiber cable between the cutting blade and the fixed blade.

9. The system of continuously producing the optical fiber cable according to claim 1, wherein the sealing device comprises:

a second machine frame;

a conveyor belt, installed at the second machine frame and used for conveying the sealing plate, wherein one end of the conveyor belt is a conveying out end;

a first stopping needle, movably disposed at a front end of the conveying out end and used for cooperating with the first piece of the sealing plate from the conveying out end thereby preventing the sealing plate from moving outside;

a first lift mechanism, installed at the second machine frame and configured to drive the first stopping needle to move up and down, wherein the first stopping needle no longer blocks the sealing plate when the first lift mechanism drives the first stopping needle to move upward;

two third cylinders, disposed at two sides of the conveying out end of the conveyor belt, wherein the two third cylinders cooperate with each other and are configured to tighten the first piece of the sealing plate from the conveying out end;

two fourth cylinders, installed at two sides of the conveyor belt, respectively, wherein the fourth cylinders correspond to and cooperate with the third cylinders one by one, a piston rod of each of the fourth cylinders is fixed with the corresponding third cylinder, and the two fourth cylinders cooperate with each other and are configured to drive the two third cylinders and the sealing plate tightened by the third cylinders to move away from the conveyor belt;

second nailing guns, used to make the sealing plate conveyed from the fourth cylinders fixed at the supporting disks of the finished tray rolled with the optical fiber cable;

third lift mechanisms, installed at the second machine frame and configured to drive the second nailing guns to move up and down;

tray transporting rails, disposed below the conveyor belt; and a transporting seat, movably disposed on the tray transporting rails and used to support the finished tray rolled with the optical fiber cable.

10. The system of continuously producing the optical fiber cable according to claim 9, wherein the sealing device further comprises a controller controlling operation of the first lift mechanism, the third lift mechanisms, the third cylinders, the fourth cylinders, the conveyor belt, and the second nailing guns, and first photoelectric sensors disposed above two sides of the conveying out end of the conveyor belt, and the first photoelectric sensors are electrically connected with the controller and are configured to detect whether the first piece of the sealing plate from the conveying out end is in place.

11. The system of continuously producing the optical fiber cable according to claim 10, wherein the front end of the conveying out end of the conveyor belt has a storing plate, there is a gap between the first stopping needle and the storing plate, and the first photoelectric sensors are configured to emit infrared rays to the gap thereby detecting whether corresponding sides of the sealing plate are in place.

12. The system of continuously producing the optical fiber cable according to claim 9, wherein the sealing device further comprises:

a second stopping needle, movably disposed at a front end of the first stopping needle and used to cooperate with the sealing plate conveyed by the fourth cylinders thereby limiting a position of the sealing plate; and a second lift mechanism, configured to drive the second stopping needle to move up and down, wherein the second stopping needle no longer blocks the sealing plate conveyed by the fourth cylinders when the second lift mechanism drives the second stopping needle to move upward.

13. The system of continuously producing the optical fiber cable according to claim 9, wherein the second machine frame comprises two upright posts, each of the upright posts has a vertical guide rail, the sealing device further comprises two seat tightening assemblies and two lift assemblies, the seat tightening assemblies are movably disposed at the corresponding vertical guide rails and are used to tighten and drive the finished tray rolled with the optical fiber cable to rotate, and the lift assemblies are used to drive the corresponding seat tightening assemblies to move up and down along the vertical guide rails; and each of the seat tightening assemblies comprises:

a second lift seat, slidably disposed at the corresponding vertical guide rail, wherein the second lift seat has a horizontal guide rail;

a horizontal moving seat, slidably disposed at the horizontal guide rail;

a tightening disk, rotatably installed at the horizontal moving seat, wherein the tightening disk is used to cooperate with a side wall of one of the supporting disks of the finished tray rolled with the optical fiber cable;

a first servo motor, configured to drive the tightening disk to rotate; and a fifth cylinder, installed at the second lift seat and configured to drive the horizontal moving seat to reciprocate along the horizontal guide rail; and two seat tightening assemblies cooperate with each other and are used to tighten two supporting disks of the finished tray rolled with the optical fiber cable, respectively.

14. The system of continuously producing the optical fiber cable according to claim 13, wherein each of the tightening disks comprises:

a disk body;

a positioning protrusion, fixed at a middle section of the disk body and used to cooperate with one of the positioning holes of the finished tray rolled with the optical fiber cable for positioning; and a plurality of auxiliary rods, fixed at the disk body and uniformly arranged around an axis of the disk body, wherein an end of each of the auxiliary rods has an elastic sucker.

15. The system of continuously producing the optical fiber cable according to claim 13, wherein the sealing device further comprises a controller and a plurality of second photoelectric sensors disposed at the upright posts spaced apart from each other up and down, the second photoelectric sensors and the second servo motors are electrically connected with the controller, and each of the second photoelectric sensors is configured to detect a height range of the supporting disks of the finished tray rolled with the optical fiber cable.

* * * * *